US012610238B2

(12) United States Patent
Li et al.

(10) Patent No.: US 12,610,238 B2
(45) Date of Patent: Apr. 21, 2026

(54) POSTPONED CERTIFICATE CREDENTIAL INSTALLATION TO WIRELESS DEVICES

(71) Applicant: Apple Inc., Cupertino, CA (US)

(72) Inventors: Li Li, Los Altos, CA (US); Aurelien P. Raboisson, San Diego, CA (US); Ngabin S. Ng, San Diego, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 18/517,966

(22) Filed: Nov. 22, 2023

(65) Prior Publication Data

US 2024/0357354 A1      Oct. 24, 2024

Related U.S. Application Data

(60) Provisional application No. 63/497,200, filed on Apr. 19, 2023.

(51) Int. Cl.
*H04L 29/06* (2006.01)
*H04W 12/06* (2021.01)
*H04W 12/069* (2021.01)

(52) U.S. Cl.
CPC ....... *H04W 12/069* (2021.01); *H04W 12/068* (2021.01)

(58) Field of Classification Search
CPC .............. H04W 12/068; H04W 12/069; H04L 63/0823; H04L 63/10; G06F 21/33
See application file for complete search history.

(56) References Cited

U.S. PATENT DOCUMENTS

2023/0254676 A1* 8/2023 Ståhl ..................... H04W 8/245
                                                          455/419
2024/0281244 A1* 8/2024 Gifre ..................... H04L 9/0897

* cited by examiner

*Primary Examiner* — Amir Mehrmanesh
*Assistant Examiner* — Chi D Nguy
(74) *Attorney, Agent, or Firm* — DICKINSON WRIGHT RLLP

(57) ABSTRACT

This application describes techniques for postponed certificate credential installation to wireless devices, including generation and storage of secured scripts to be used for subsequent certificate credential installation on an eUICC of a wireless device after manufacturing. Management of certificate credentials, including installation on, modification to, and removal from, an eUICC can occur post-manufacturing, such as during a device activation procedure or as part of remote electronic subscriber identity module (eSIM) provisioning to the eUICC of the wireless device. Updating certificate credentials on an eUICC can allow for wireless device operation in different geographic regions that use different public key infrastructures (PKIs) with distinct root certificate issuers. The secured scripts can be pre-generated by an eUICC manufacturer (EUM) for the particular eUICC and stored at an OEM networked server and later used to install the certificate credentials on the eUICC of the wireless device.

20 Claims, 20 Drawing Sheets eUICC Personalization During Device Activation

100

Mobile Network Operator 114

Provisioning Server
116

Base
Station
112-1

Base
Station
112-2

Base
Station
112-N

• • •

Wireless Device 102

Processor(s) 104

Memory
106 eUICC
108

Baseband
Component
110

UICC
118

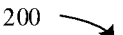
200
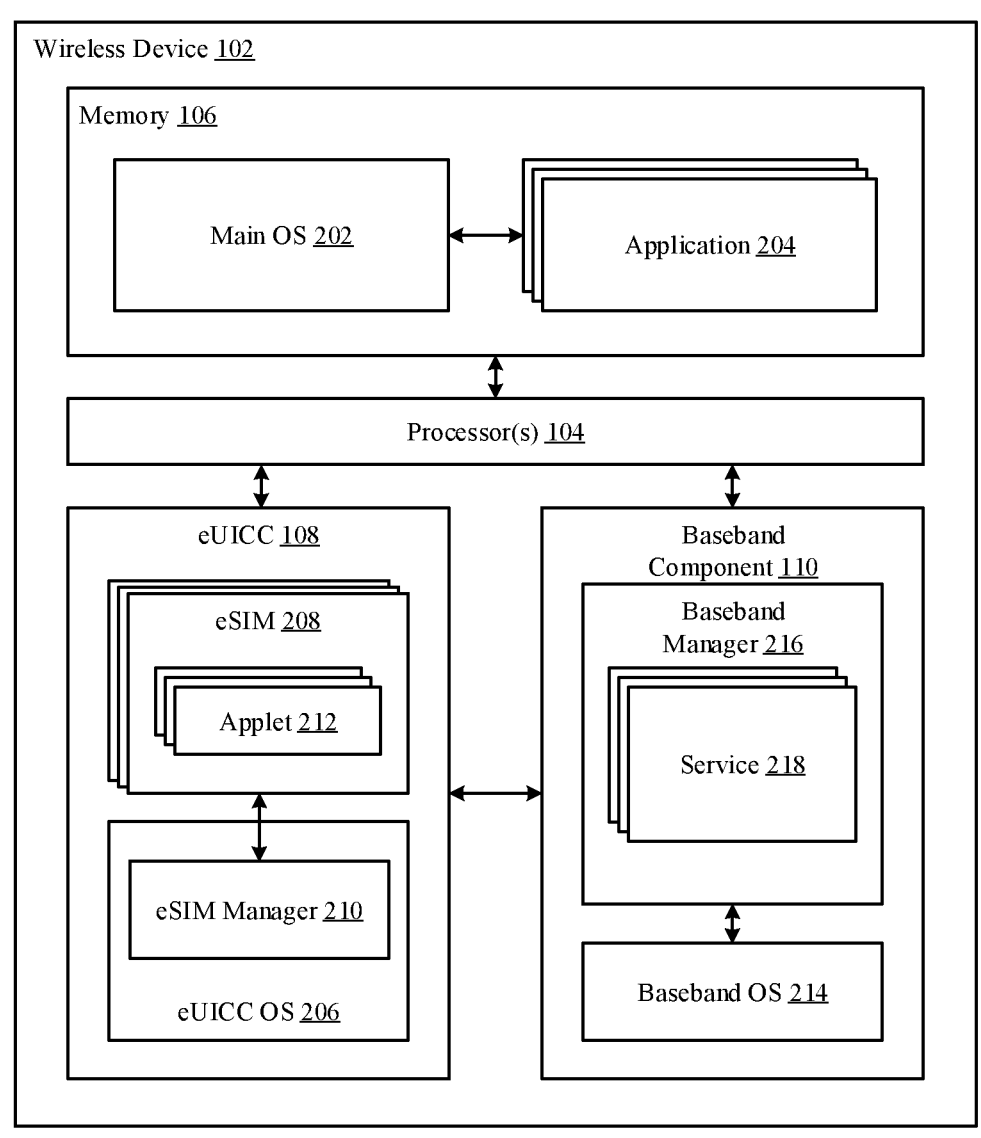
*FIG. 2*

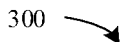
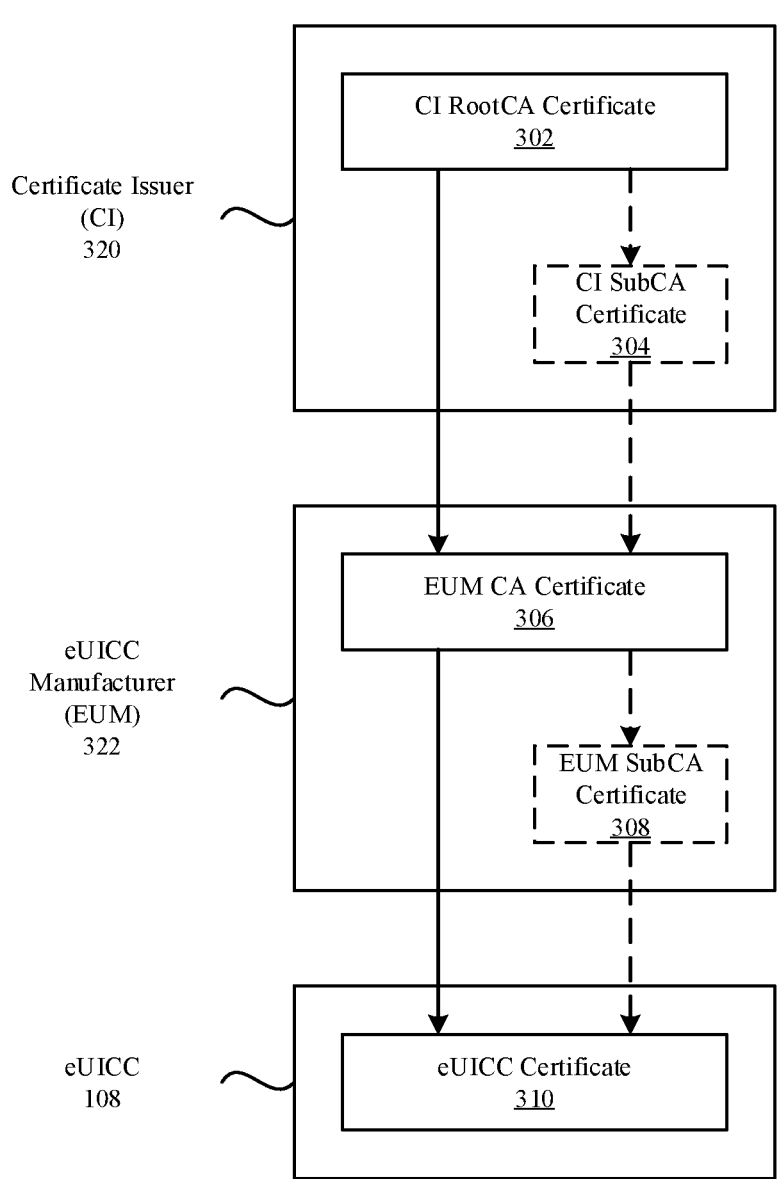
*FIG. 3A*

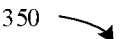
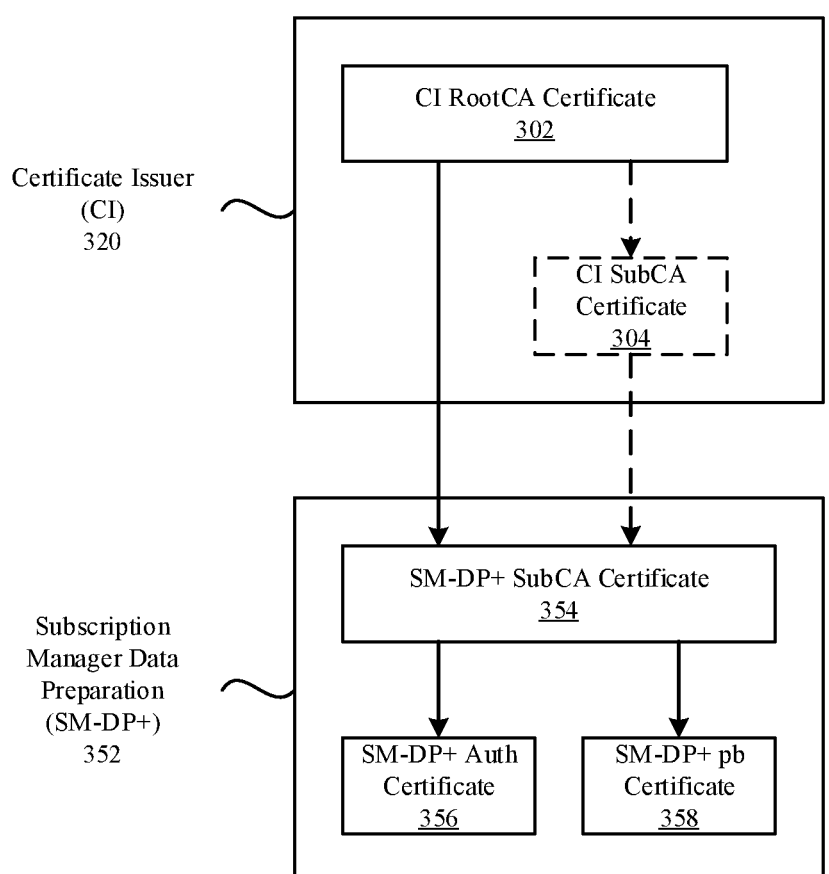
*FIG. 3B*

360

SM-DP+
352

Device Processor
362

Local Profile
Assistant
(LPAd)
364

Wireless Device
102 eUICC
108

Issuer Security
Domain Root
(ISD-R)
366

Local Profile
Assistant
(LPAe)
368 eUICC Controlling Authority
Security Domain
(ECASD)
370 eUICC Certificate
310
eUICC Private/Public Key Pair
372
CI RootCA Certificate
302
EUM CA Certificate
306
OEM RootCA Certificate
376
EUM Keyset
378

400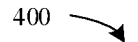
Initial eUICC Provisioning
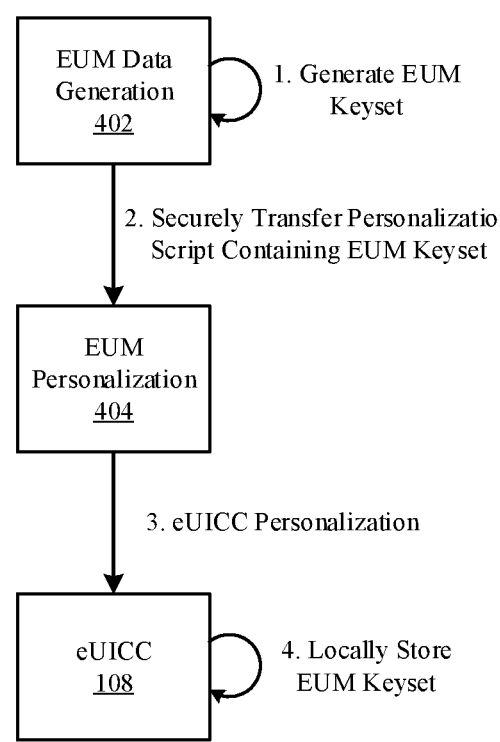
*FIG. 4A*

420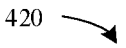
Update Script Creation and Deployment
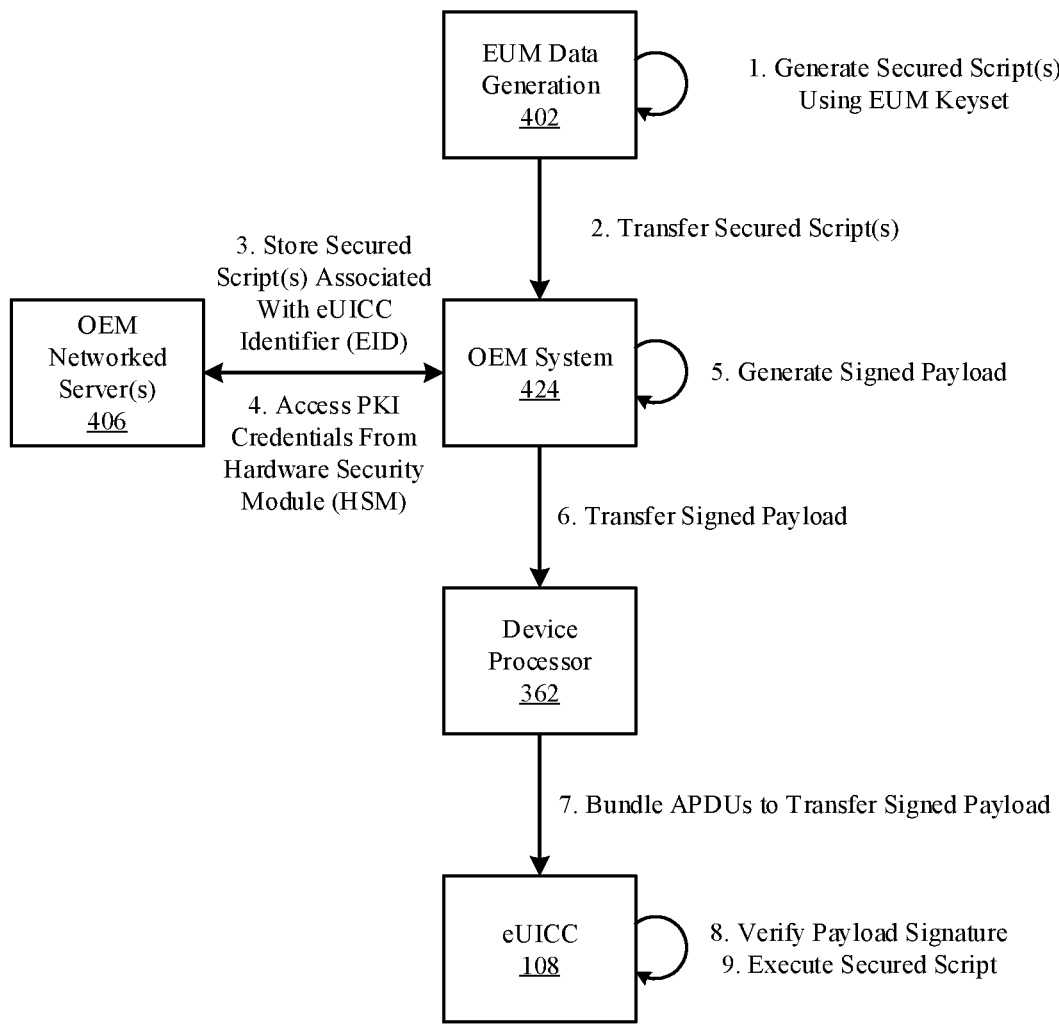
*FIG. 4B*

500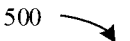
eUICC Personalization During Device Activation
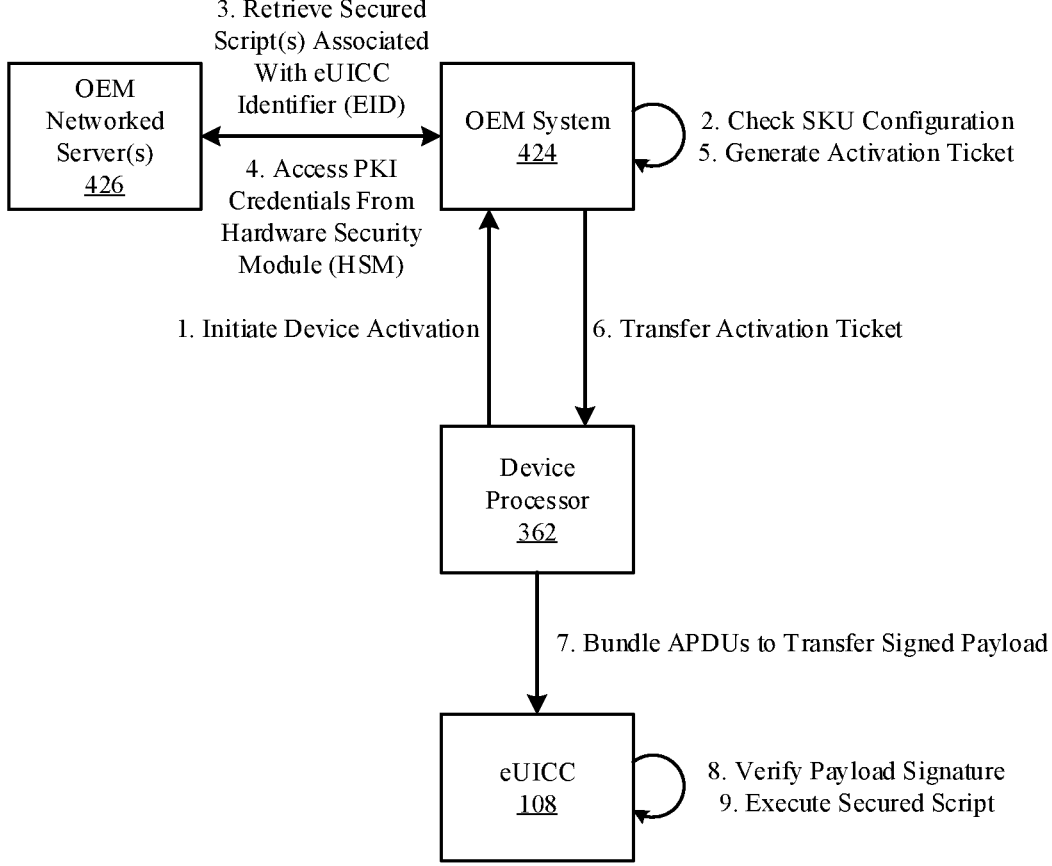
*FIG. 5*

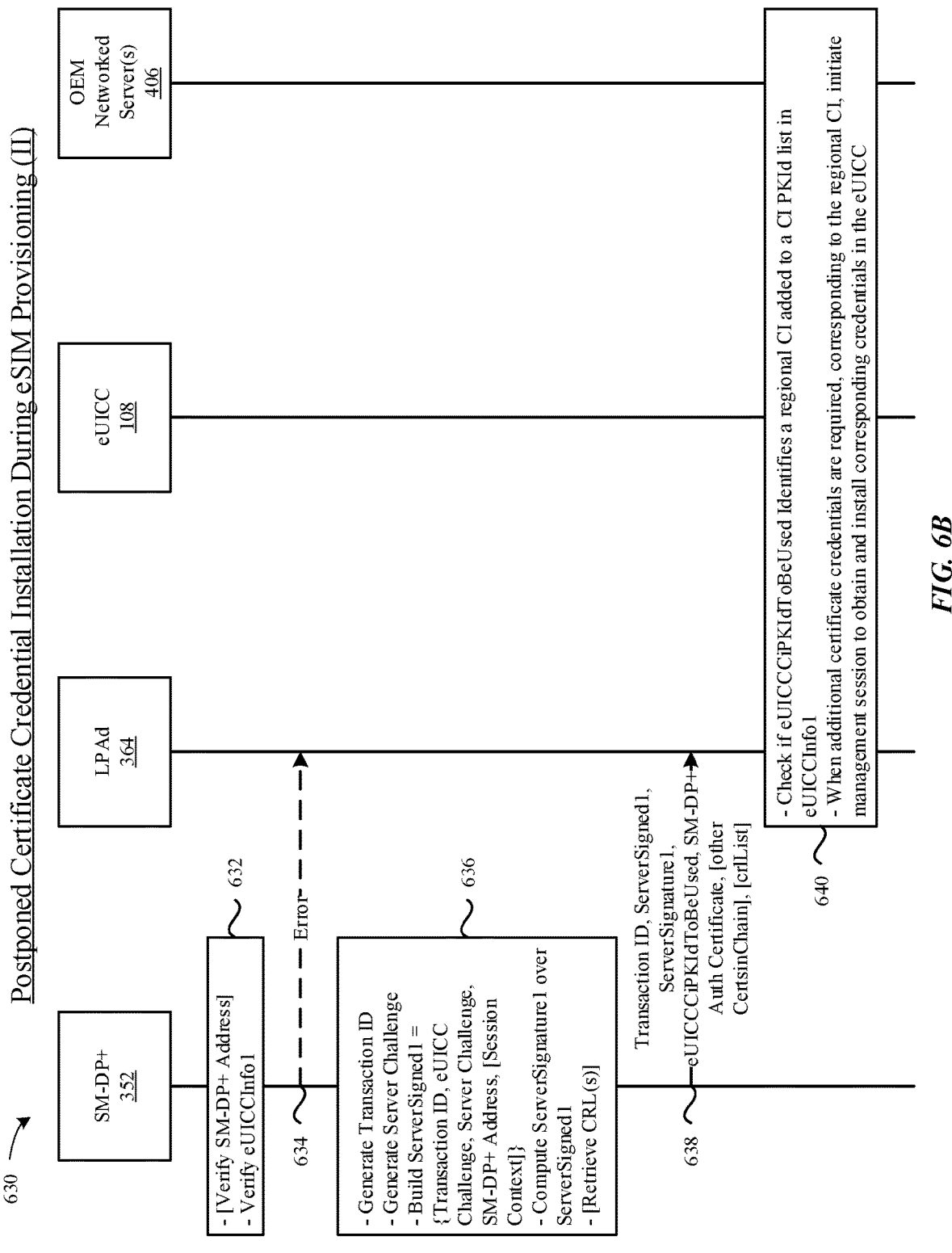

Postponed Certificate Credential Installation During eSIM Provisioning (II)

OEM Networked Server(s) 406 eUICC 108

LPAd 364

SM-DP+ 352

630

632
- [Verify SM-DP+ Address]
- Verify eUICCInfo1

634
- - - Error - - - ►

636
- Generate Transaction ID
- Generate Server Challenge
- Build ServerSigned1 = {Transaction ID, eUICC Challenge, Server Challenge, SM-DP+ Address, [Session Context]}
- Compute ServerSignature1 over ServerSigned1
- [Retrieve CRL(s)]

638
Transaction ID, ServerSigned1, ServerSignature1, eUICCCiPKIdToBeUsed, SM-DP+ Auth Certificate, [other CertsinChain], [crlList]

640
- Check if eUICCCiPKIdToBeUsed Identifies a regional CI added to a CI PKId list in eUICCInfo1
- When additional certificate credentials are required, corresponding to the regional CI, initiate management session to obtain and install corresponding credentials in the eUICC

FIG. 6B

Postponed Certificate Credential Installation During eSIM Provisioning (III)

Postponed Certificate Credential Installation (IV)

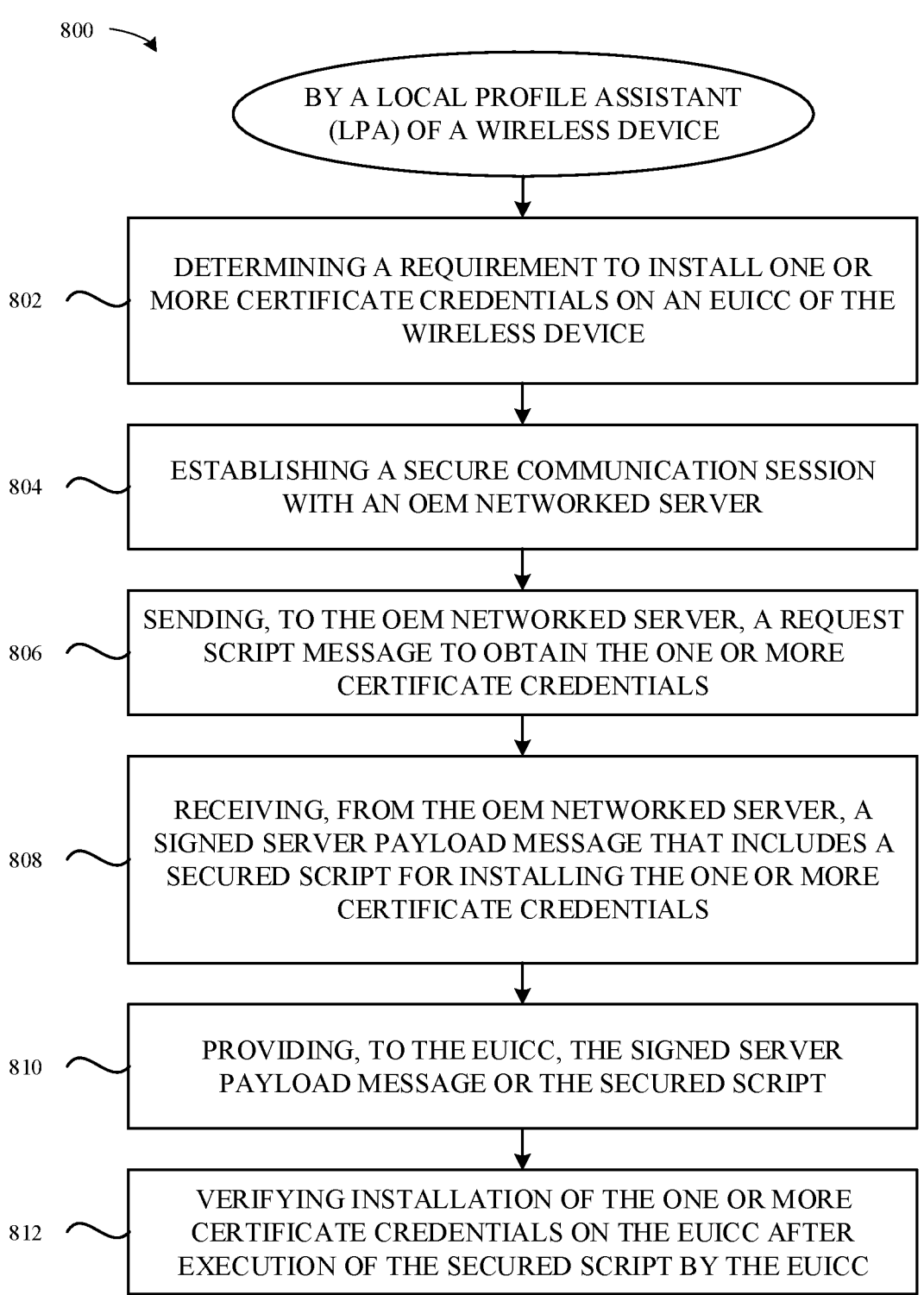

800

802  DETERMINING A REQUIREMENT TO INSTALL ONE OR MORE CERTIFICATE CREDENTIALS ON AN EUICC OF THE WIRELESS DEVICE

804  ESTABLISHING A SECURE COMMUNICATION SESSION WITH AN OEM NETWORKED SERVER

806  SENDING, TO THE OEM NETWORKED SERVER, A REQUEST SCRIPT MESSAGE TO OBTAIN THE ONE OR MORE CERTIFICATE CREDENTIALS

808  RECEIVING, FROM THE OEM NETWORKED SERVER, A SIGNED SERVER PAYLOAD MESSAGE THAT INCLUDES A SECURED SCRIPT FOR INSTALLING THE ONE OR MORE CERTIFICATE CREDENTIALS

810  PROVIDING, TO THE EUICC, THE SIGNED SERVER PAYLOAD MESSAGE OR THE SECURED SCRIPT

812  VERIFYING INSTALLATION OF THE ONE OR MORE CERTIFICATE CREDENTIALS ON THE EUICC AFTER EXECUTION OF THE SECURED SCRIPT BY THE EUICC

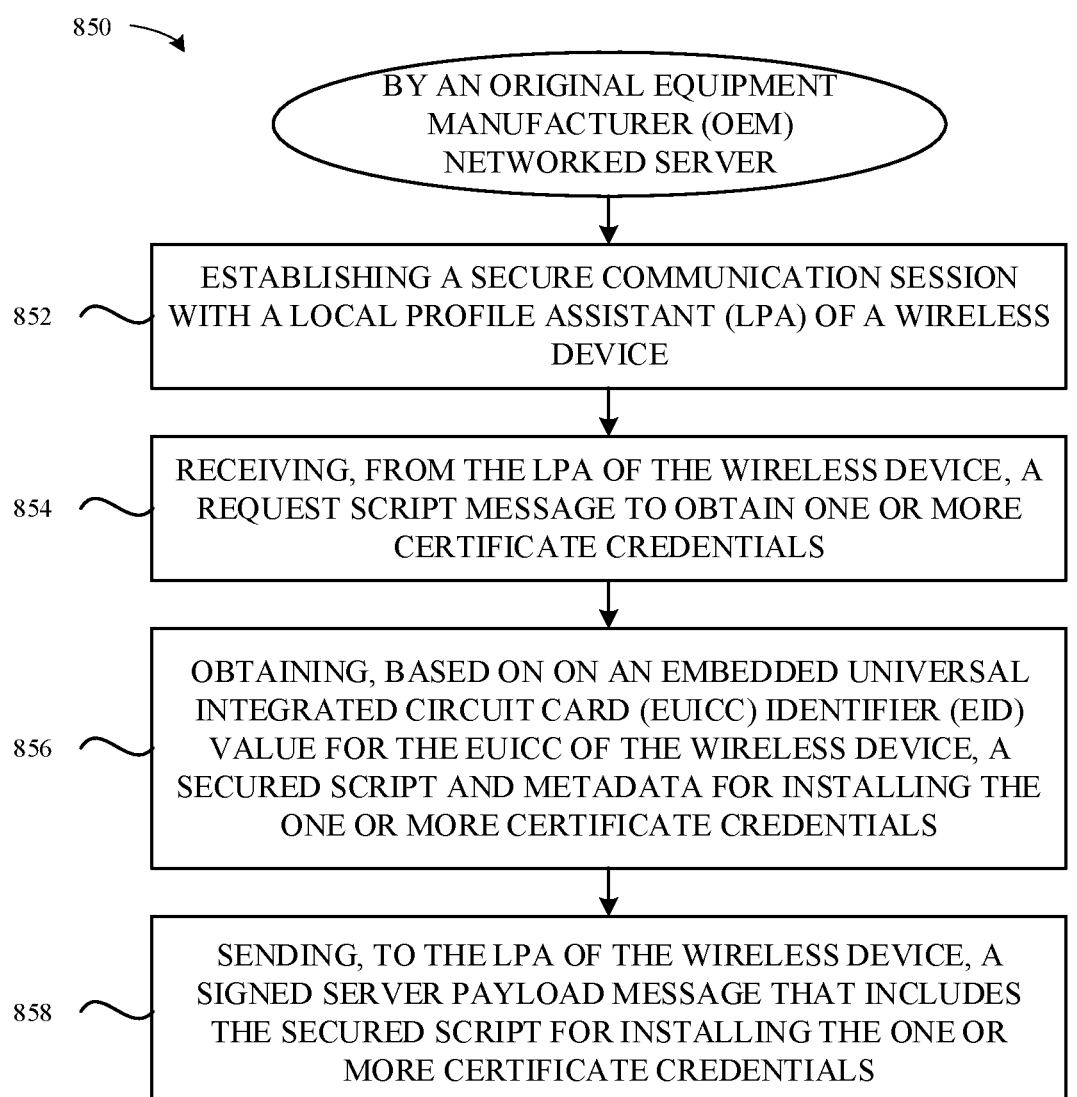

BY AN ORIGINAL EQUIPMENT MANUFACTURER (OEM) NETWORKED SERVER

852    ESTABLISHING A SECURE COMMUNICATION SESSION WITH A LOCAL PROFILE ASSISTANT (LPA) OF A WIRELESS DEVICE

854    RECEIVING, FROM THE LPA OF THE WIRELESS DEVICE, A REQUEST SCRIPT MESSAGE TO OBTAIN ONE OR MORE CERTIFICATE CREDENTIALS

856    OBTAINING, BASED ON ON AN EMBEDDED UNIVERSAL INTEGRATED CIRCUIT CARD (EUICC) IDENTIFIER (EID) VALUE FOR THE EUICC OF THE WIRELESS DEVICE, A SECURED SCRIPT AND METADATA FOR INSTALLING THE ONE OR MORE CERTIFICATE CREDENTIALS

858    SENDING, TO THE LPA OF THE WIRELESS DEVICE, A SIGNED SERVER PAYLOAD MESSAGE THAT INCLUDES THE SECURED SCRIPT FOR INSTALLING THE ONE OR MORE CERTIFICATE CREDENTIALS

*FIG. 8B*

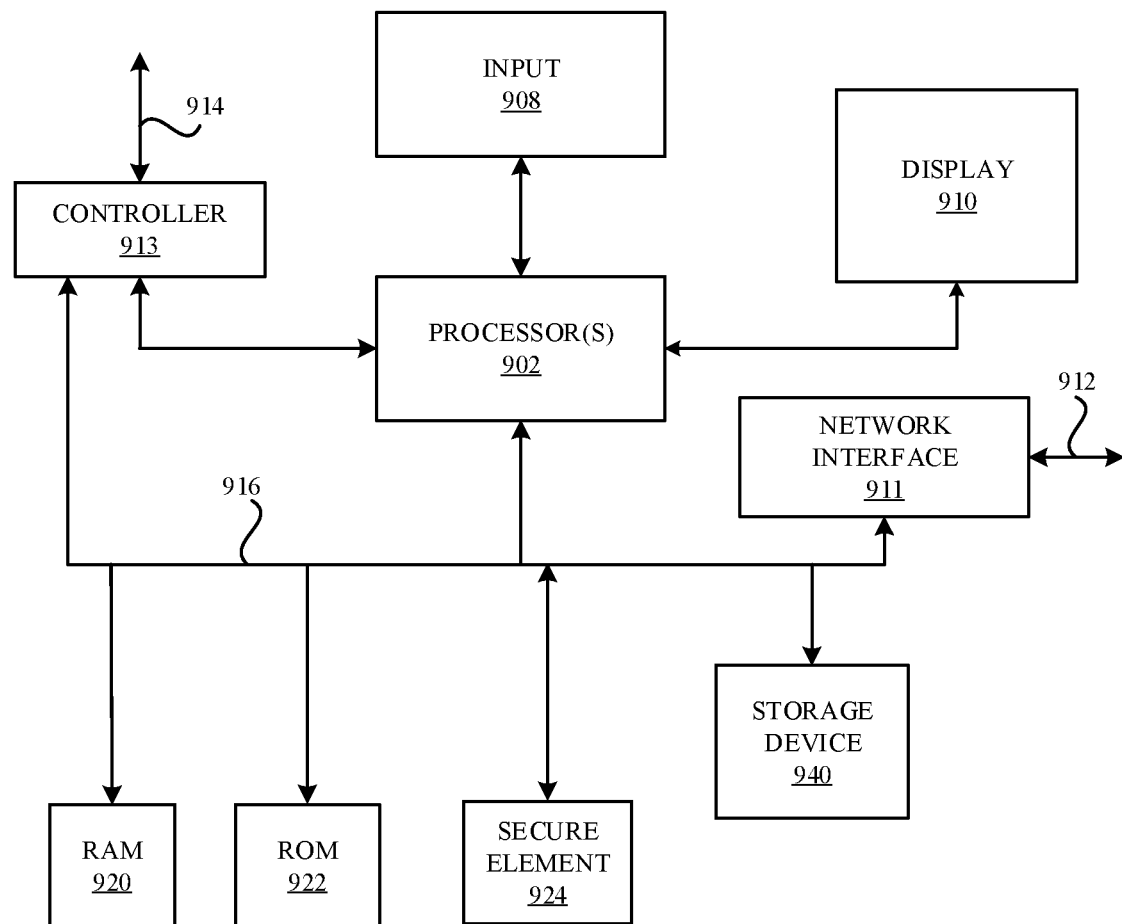
*FIG. 9*

1

POSTPONED CERTIFICATE CREDENTIAL INSTALLATION TO WIRELESS DEVICES

CROSS-REFERENCE TO RELATED APPLICATIONS

The present application claims the benefit of U.S. Provisional Application No. 63/497,200, entitled "POSTPONED CERTIFICATE CREDENTIAL INSTALLATION TO WIRELESS DEVICES," filed Apr. 19, 2023, the content of which is incorporated by reference herein in its entirety for all purposes.

FIELD

The described embodiments set forth techniques for postponed certificate credential installation to wireless devices, including generation and storage of secured scripts for subsequent credential installation on a secure element, e.g., an embedded Universal Integrated Circuity Card (eUICC), of a wireless device after manufacturing. Management of certificate credentials, including installation, modification, and removal, can occur post-manufacturing such as during a device activation procedure or as part of remote electronic subscriber identity module (eSIM) provisioning to the eUICC of the wireless device.

BACKGROUND

Many wireless devices are configured to use removable Universal Integrated Circuit Cards (UICCs) that enable the wireless devices to access services provided by Mobile Network Operators (MNOs). In particular, each UICC includes at least a microprocessor and a non-volatile memory, where the non-volatile memory is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a wireless device. Changing between profiles can be accomplished by switching SIM cards installed in the wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs- and can eliminate the need to include UICC-receiving bays in wireless devices. Additionally, some wireless devices, such as wearable wireless devices, home automation Internet of Things (IoT) wireless devices, and wireless equipped vehicles may not support UICCs.

Certificate credentials are used by wireless devices and network entities of cellular wireless networks to perform security procedures, such as cryptographic operations, digital signing, message verification, mutual authentication, and the like. Conventionally, certificate credentials are generated and stored in secure elements, e.g., UICCs and eUICCs, during a manufacturing process. Different regions of the world may use different public key infrastructures (PKIs) that require different sets of certificate credentials, which creates logistical challenges to install multiple sets of certificate credentials, thereby incurring increased cost, or to manage distinct stock keeping units (SKUs) for different products with different certificate credentials installed therein. There exists a need for postponed certificate credential installation in wireless devices after manufacture of the secure elements and of the wireless devices to reduce cost, simplify manufacturing flows, and increase flexibility in assignment and management of certificate credentials to wireless devices.

SUMMARY

The described embodiments set forth techniques for postponed certificate credential installation to wireless devices, including generation and storage of secured scripts to be used for subsequent certificate credential installation on a secure element, e.g., an embedded Universal Integrated Circuity Card (eUICC), of a wireless device after manufacturing. Management of certificate credentials, including installation on, modification to, and removal from, an eUICC can occur post-manufacturing, such as during a device activation procedure or as part of remote electronic subscriber identity module (eSIM) provisioning to the eUICC of the wireless device. Certificate credentials on an eUICC can include one or more root certificate authority (CA) certificates and associated public keys, one or more eUICC manufacturer (EUM) certificates and associated public keys, eUICC private keys, and eUICC certificates and associated public keys. The eUICC can additionally store an original equipment manufacturer (OEM) RootCA certificate and an EUM keyset used for securely obtaining new or updated certificate credentials to install on the eUICC. The OEM RootCA certificate and the EUM keyset can be used for secure communication of the new/updated certificate credentials, embedded in secured scripts, to the OEM networked server by the EUM and from the OEM networked server by the wireless device. The EUM keyset can include symmetric keys or asymmetric keys used to perform cryptographic operations for secure communication of the secured scripts and new/updated certificate credentials. During device activation or when installing an eSIM to an eUICC, a wireless device determines whether certificate credentials are required to be installed on the eUICC. In some embodiments, the wireless device detects a requirement for certificate credentials during a mutual authentication procedure with a mobile network operator (MNO) provisioning server, such as a subscription manager—data preparation (SM-DP+) server, and obtains the required certificate credentials from an original equipment manufacturer (OEM) networked server. The wireless device can trigger installation of certificate credentials applicable to a geographic region in which the wireless device is operating or for which an eSIM is to be downloaded to the eUICC. In some embodiments, one or more secured scripts, such as SCP03 scripts, are pre-generated by an EUM for an eUICC that can be uniquely identified by an eUICC identifier (EID) value. The secured scripts can be stored at one or more OEM networked servers for later retrieval post-manufacturing of the eUICC and of the wireless device in which the eUICC is installed. The wireless device can download a secured script from the OEM networked server and install the certificate credentials in the eUICC by executing the secured script on the eUICC. The certificate credentials installed on the eUICC can include a RootCA certificate, an EUM CA certificate, an eUICC private and public key pair, and an eUICC certificate. In some embodiments a device-level (external to the eUICC) local profile assistant (LPA) performs a security check on a signed server payload, which includes the secured script, obtained from the OEM networked server. In some embodiments, the eUICC performs the security check on the signed server payload that includes the secured script. In some embodiments, the secured script is provided with an activation ticket from the OEM networked server during activation of the wireless device. In some embodiments, secured scripts are also generated for management of certificate credentials on an eUICC, such as modification, deletion, temporary deactivation, renewal, revocation and the like. The wireless device can obtain from an OEM networked server and execute one or more secured scripts to manage certificate credentials on the eUICC of the wireless device.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 2 illustrates a block diagram of a more detailed view of exemplary components of the system of FIG. 1, according to some embodiments.

FIG. 3A illustrates a diagram of an exemplary certificate chain for certificate credentials of a wireless device, according to some embodiments.

FIG. 3B illustrates a diagram of an exemplary certificate chain for certificate credentials of an SM-DP+ server, according to some embodiments.

FIG. 4A illustrates a flowchart of an exemplary provisioning of select certificate credentials to an eUICC during manufacturing, according to some embodiments.

FIG. 4B illustrates a flowchart of an exemplary procedure to create and deploy secured scripts to update certificate credentials for an eUICC of a wireless device post-manufacturing, according to some embodiments.

FIG. 5 illustrates a flowchart of an exemplary process to install certificate credentials in an eUICC of a wireless device during device activation, according to some embodiments.

FIGS. 6A, 6B, 6C, and 6D illustrate flowcharts of an exemplary procedure to install certificate credentials in an eUICC of a wireless device during provisioning of an eSIM, according to some embodiments.

FIG. 8A illustrates a flowchart of an exemplary method to install one or more certificate credentials on an eUICC of a wireless device, according to some embodiments.

FIG. 8B illustrates a flowchart of an exemplary method to provide one or more certificate credentials for installation on an eUICC of a wireless device, according to some embodiments.

FIG. 9 illustrates a block diagram of exemplary elements of a mobile wireless device, according to some embodiments.

DETAILED DESCRIPTION

Figure 1:
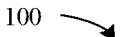
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments set forth techniques for management of certificate credentials on a secure element, e.g., an embedded Universal Integrated Circuity Card (eUICC), of a wireless device after manufacturing. Certificate credentials can be pre-generated for an eUICC identified by a unique eUICC identifier (EID) value and later installed on the eUICC of the wireless device. An eUICC manufacturer (EUM) can generate one or more secured scripts, e.g., secure channel protocol version 03 (SCP03) scripts to install one or more certificate credentials on the eUICC of a wireless device. In some embodiments, the EUM manufactures the eUICC and installs a first set of certificate credentials, and later after installation of the eUICC in the wireless device and delivery to a user, a second set of certificate credentials are installed on the eUICC of the wireless device. In some embodiments, the second set of certificate credentials supplements the certificate credentials on the eUICC. In some embodiments, the second set of certificate credentials modifies the first set of certificate credentials on the eUICC. In some embodiments, the second set of certificate credentials replaces the first set of certificate credentials on the eUICC. Management of certificate credentials on an eUICC can include installation, modification, and/or removal of certificate credentials for an post-manufacturing. Updating of certificate credentials on the eUICC can occur during a device activation procedure or as part of remote electronic subscriber identity module (eSIM) provisioning to the eUICC of the wireless device.

Certificate credentials on an eUICC can include one or more certificate issuer (CI) root certificate authority (CA) certificates and associated public keys, one or more eUICC manufacturer (EUM) certificates and associated public keys, eUICC private keys, and eUICC certificates and associated public keys. The certificate credentials can be stored in an eUICC controlling authority security domain (ECASD) on the eUICC of the wireless device. The ECASD can also contain additional credentials including an original equipment manufacturer (OEM) RootCA credential and an EUM keyset used for secure communication of new/updated certificate credentials, embedded in secured scripts, to the eUICC of the wireless device. The EUM keyset can include symmetric keys or asymmetric keys to perform cryptographic operations for secure communication of the secured scripts and new/updated certificate credentials. Different geographic regions can use different public key infrastructures (PKIs) that require use of certificate credentials chained via different CAs to a particular CI. For example, some eSIMs used for access to cellular wireless service in a first geographic region can require certificate credentials stemming from a Global System Mobile Alliance (GSMA) CI, while other eSIMs used for access to cellular wireless service in a second geographic region can require certificate credentials stemming from a China Telecommunication Technology Labs (CTTL) CI. In some embodiments, an EUM manufactures an eUICC and installs a set of certificate credentials applicable for a first geographic region, and later installation of the eUICC in a wireless device and post-manufacturing of the wireless device, one or more additional certificate credentials are required to be installed in the wireless device to access cellular wireless service in a second geographic region. In some embodiments, the eUICC is manufactured by the EUM and provided to an original equipment manufacturer (OEM) for installation in a wireless device with a minimal set of certificate credentials included therein to enable the wireless device to obtain an expanded or additional set of certificate credentials. The minimal set of certificate credentials in the eUICC can include an EUM keyset and an OEM RootCA certificate provided by an original equipment manufacturer (OEM) to allow a wireless device, in which the eUICC is installed, to obtain the expanded or additional certificate credentials to use in a particular geographic region.

During device activation or when installing an eSIM to an eUICC, a wireless device determines whether certificate credentials are required to be installed on the eUICC. In some embodiments, the wireless device detects a requirement for certificate credentials during a mutual authentication procedure with a mobile network operator (MNO) provisioning server, such as a subscription manager—data preparation (SM-DP+) server, and obtains the required certificate credentials from an original equipment manufacturer (OEM) networked server. In some embodiments, a local profile assistant (LPA), operating on a processor of the wireless device external to the eUICC, determines the requirement for certificate credentials based on an audit of a certificate list provided by the eUICC. The LPA can determine the eUICC of the wireless device does not include one or more certificate credentials, which may be required for access to cellular wireless service in a particular geographic region and/or to install an eSIM with which to access cellular wireless service in the particular geographic region. The wireless device can trigger installation of one or more certificate credentials applicable to a geographic region in which the wireless device is operating or for which an eSIM is to be downloaded to the eUICC. Execution of one or more secured scripts can be used to install the one or more credentials on the eUICC of the wireless device.

In some embodiments, one or more secured scripts, such as SCP03 scripts, are pre-generated by an EUM for an eUICC that can be uniquely identified by an eUICC identifier (EID) value. The EUM can be associated via different certificate chains to a different root CIs applicable to different geographic regions. The secured scripts can be used to install certificate credentials for a geographic region to an eUICC of a wireless device after the wireless device is manufactured. The secured scripts can be securely communicated to and stored at one or more OEM networked servers for later retrieval post-manufacturing of the eUICC and of the wireless device in which the eUICC is installed. The eUICC of the wireless device can include cryptographic keys, e.g., an EUM keyset, installed in the eUICC when manufactured and an OEM RootCA certificate to allow for secure communication of the secured scripts from an OEM networked server to the eUICC of the wireless device. The wireless device can download a secured script from the OEM networked server and install the certificate credentials in the eUICC by executing the secured script on the eUICC. The certificate credentials installed on the eUICC can include a CI RootCA certificate, an EUM CA certificate, an eUICC private and public key pair, and an eUICC certificate. In some embodiments the LPA performs a security check on a signed server payload, which includes the secured script, obtained from the OEM networked server, e.g., by verifying a signature that accompanies the server payload and an OEM server certificate included with the signed server payload, e.g., using the OEM RootCA certificate previously loaded to the eUICC. In some embodiments, the eUICC performs the security check on the signed server payload that includes the secured script. In some embodiments, the secured script is provided with an activation ticket from the OEM networked server during activation of the wireless device. In some embodiments, secured scripts are also generated for management of certificate credentials on an eUICC, such as modification, deletion, temporary deactivation, renewal, revocation and the like. The wireless device can obtain from an OEM networked server and execute one or more secured scripts to manage certificate credentials on the eUICC of the wireless device.

These and other embodiments are discussed below with reference to FIGS. 1-9; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a wireless device 102, which can also be referred to as a device, a mobile wireless device, a mobile device, a user equipment (UE) and the like, a group of base stations 112-1 to 112-N that are managed by different Mobile Network Operators (MNOs) 114, and a set of provisioning servers 116 that are in communication with the MNOs 114. Additional MNO infrastructure servers, such as used for account management and billing are not shown. The wireless device 102 can represent a mobile computing device (e.g., an iPhone® or an iPad® by Apple®) or a cellular-capable wearable device (e.g., an Apple Watch), the base stations 112-1 to 112-n can represent cellular wireless network entities including evolved NodeBs (eNodeBs or eNBs) and/or next generation NodeBs (gNodeBs or gNBs) that are configured to communicate with the wireless device 102, and the MNOs 114 can represent different wireless service providers that provide specific cellular wireless services (e.g., voice and data) to which a user of the wireless device 102 can subscribe, such as via a subscription account, and access using cellular wireless service credentials provided by the MNOs 114.

As shown in FIG. 1, the wireless device 102 can include processing circuitry, which can include one or more processor(s) 104 and a memory 106, an embedded Universal Integrated Circuit Card (eUICC) 108, and baseband wireless circuitry used for transmission and reception of cellular wireless radio frequency signals. The baseband wireless circuitry can include analog hardware components, such as antennas and amplifiers, as well as digital processing components, such as signal processors (and/or general/limited purpose processors), e.g., a baseband component 110, and associated memory. In some embodiments, the wireless device 102 includes one or more physical UICCs 118, also referred to as Subscriber Identity Module (SIM) cards, in addition to or substituting for the eUICC 108. The components of the wireless device 102 work together to enable the wireless device 102 to provide useful features to a user of the wireless device 102, such as cellular wireless network access, non-cellular wireless network access, localized computing, location-based services, and Internet connectivity. The eUICC 108 can store multiple electronic SIMs (eSIMs), also referred to as eSIM profiles, which are configured for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different cellular wireless subscriptions with which the wireless device 102 is associated. To be able to access services provided by an MNO 114, an eSIM can be reserved for subsequent download and installation to the eUICC 108. In some embodiments, the eUICC 108 obtains one or more eSIMs from one or more associated provisioning servers 116. The provisioning servers 116 can be maintained by a manufacturer of the wireless device 102, the MNOs 114, third party entities, and the like. Communication of eSIM data between an MNO provisioning server 116 and the eUICC 108 (or between the MNO provisioning server 116 and processing circuitry of the wireless device 102 external to the eUICC 108, e.g., the processor 104) can use a secure communication channel.

FIG. 2 illustrates a block diagram of a more detailed view 200 of particular components of the wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing the baseband component 110 with access to the eSIMs 208 to provide access to wireless services for the wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with the baseband component 110 and the eUICC 108, can be configured to enable the wireless device 102 to communicate with an MNO 114 and provide useful features (e.g., phone calls and internet access) to a user of the wireless device 102.

As also shown in FIG. 2, the baseband component 110 of the wireless device 102 can include a baseband OS 214 that is configured to manage hardware resources of baseband wireless circuitry (e.g., a processor, a memory, different radio components, etc.). According to some embodiments, the baseband component 110 can implement a baseband manager 216 that is configured to interface with the eUICC 108 to establish a secure channel with a provisioning server 116 of an MNO 114 and obtain information (such as eSIM data) from the provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the wireless device 102 and MNOs 114 according to the different eSIMs 208 that are enabled within the eUICC 108.

FIG. 3A illustrates a diagram 300 of an exemplary certificate chain for certificate credentials of a wireless device 102. A certificate issuer (CI) 320 generates digital certificates that can be used for authentication by other network entities and by wireless devices, where the CI 320 is a trusted root. The CI 320 can self-generate a CI root certificate authority (CA) certificate 302, which includes a CI RootCA public key, and can provide the CI RootCA certificate 302 to be installed in an eUICC 108 of a wireless device 102. The eUICC 108 can use the CI RootCA certificate 302 and associated CI RootCA public key for authentication purposes. The CI 320 can also generate an EUM CA certificate 306 for an EUM 322 that manufactures eUICCs 108 and provide the EUM CA certificate 306, which includes its own EUM public key, and an EUM private key, which corresponds to the EUM public key included in the EUM CA certificate 306, to the EUM 322. The EUM 322 can provide the EUM CA certificate 306, which includes the EUM public key, to be installed in the eUICC 108 of the wireless device 102. The EUM 322 can generate an eUICC certificate 310, which further includes its own eUICC public key, and provides the eUICC certificate 310 and an eUICC private key that corresponds to the eUICC public key to the eUICC 108 of the wireless device 102. In some cases the eUICC certificate 310 chains directly through the EUM CA certificate 306 to the CI RootCA certificate 302. In some cases the eUICC certificate 310 chains through intermediate certificates, such as a CI SubCA certificate 304 and/or an EUM SubCA certificate 308. The certificates, public keys, and corresponding private keys can be used by the network entities, e.g., the CI 320, EUM 322, and the eUICC 108 for message signing, message verification, and mutual authentication procedures.

FIG. 3B illustrates a diagram 350 of an exemplary certificate chain for certificate credentials of a provisioning server 116, e.g., a subscription manager-data preparation (SM-DP+) server 352. The CI 320 generates an SM-DP+ SubCA certificate 354, which includes its own SM-DP+ public key, and an SM-DP+ private key corresponding to the SM-DP+ public key and provides the SM-DP+ SubCA certificate 354 and SM-DP+ public/private key pair to the SM-DP+ 352. The SM-DP+ SubCA certificate 354 can chain directly to the CI RootCA certificate 302 of the CI 320 or indirectly through an intermediate certificate, such as the CI SubCA certificate 304. The SM-DP+ 352 can further include an SM-DP+ authentication (auth) certificate 356 and a separate SM-DP+ profile binding (pb) certificate 358 chained to the SM-DP+ SubCA certificate 354. The SM-DP+ auth certificate 356 can be used for authentication purposes, while the SM-DP+ pb certificate 358 can be used for creating a bound profile package (BPP) that includes an eSIM 208 for installation on an eUICC 108 of a wireless device 102.

Figure 3C:
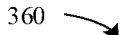
FIG. 3C illustrates a diagram of an example of communication channels for management of certificate credentials stored in an eUICC of a wireless device, according to some embodiments.
Figure 6A:
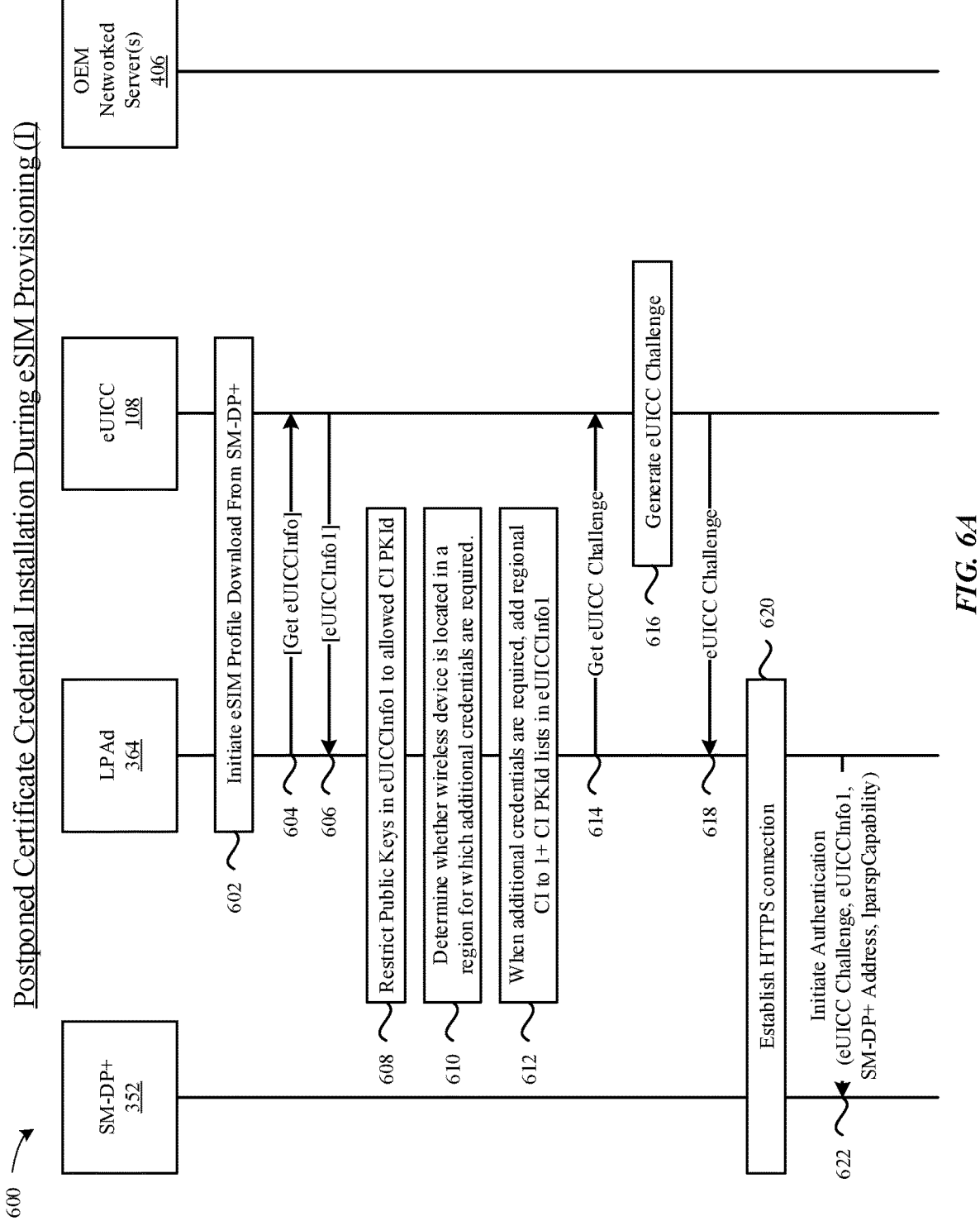
Figure 6C:
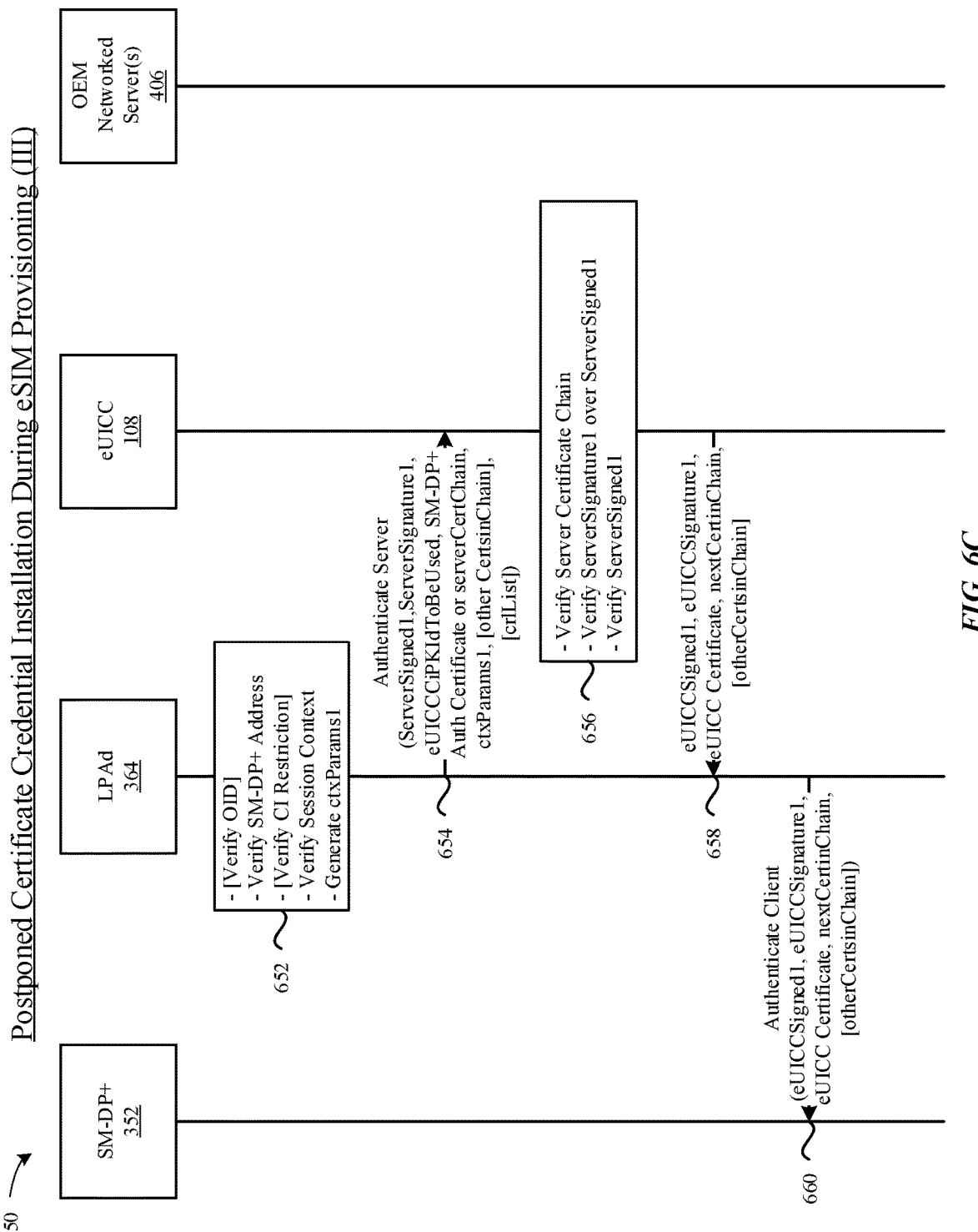
Figure 6D:
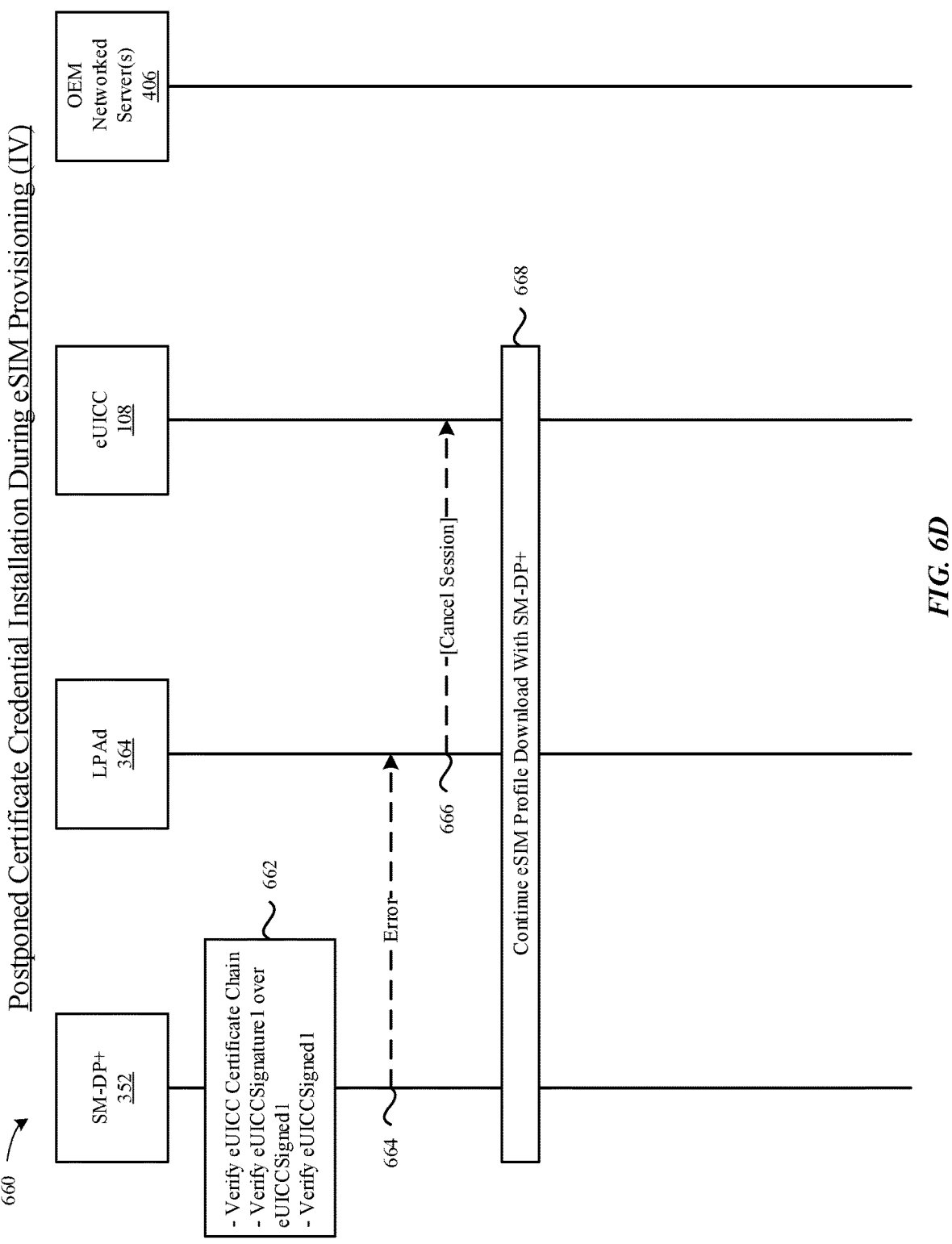

FIG. 3C illustrates a diagram 360 of an example of communication channels for communication between a wireless device 102 and network entities for management of certificate credentials stored in the eUICC 108 of the wireless device 102. The wireless device 102 includes a device processor 362, external to the eUICC 108, which includes a local profile assistant (LPA), or more precisely a device-level LPA (LPAd), that communicates with the SM-DP+ 352 and with an issuer security domain root (ISD-R) 366 in the eUICC 108. The LPA 364 can assist with remote eSIM provisioning to the eUICC 108. In some cases, an eUICC-based LPA (LPAe) 368 can communicate with the SM-DP+ 352. The eUICC 108 includes an eUICC controlling authority security domain (ECASD) 370, which stores certificate credentials for the eUICC 108. A set of certificate credentials for an ECASD 370 can include a CI RootCA certificate 302 generated by a CI 320, an EUM CA certificate 306 generated by the CI 320, and an eUICC certificate 310 and a corresponding eUICC public and private key pair 372 generated by the EUM 322. The ECASD 370 can store different sets of certificate credentials stemming from different CIs 320 to use in different geographic regions. When the eUICC 108 does not include certificate credentials applicable to a particular geographic region or for communication with an SM-DP+ 352 to obtain an eSIM 208 for use in the particular geographic region, the wireless device 102 can determine that the certificate credentials are not included in the eUICC 108 and use the processes described herein to obtain the certificate credentials. The ECASD 370 can contain supplemental credentials installed at the time of manufacture of the eUICC 108, e.g., an OEM rootCA certificate 376 and an EUM keyset 378, which can include symmetric or asymmetric cryptographic keys, where the supplemental credentials can be used for securely obtaining new or updated certificate credentials from an OEM networked server. The new or updated certificate credentials can be generated by the applicable CI 320 and EUM 322 for the eUICC 108 in advance, and can be embedded in one or more secured scripts provided to one or more OEM networked servers for storage and later retrieval to send to the wireless device 102 for installation of the new or updated certificate credentials.

FIG. 4A illustrates a flowchart 400 of an exemplary provisioning of select certificate credentials to an eUICC 108 during manufacturing of the eUICC 108 by an EUM 322. An EUM generation module 402 of the EUM 322 generates a set of cryptographic keys, which can be symmetric keys or asymmetric keys, referred to as an EUM keyset. The EUM keyset is bundled with an OEM provided RootCA certificate and securely transferred in a personalization script to an EUM personalization module 404 for personalization of the eUICC 108. The EUM keyset and OEM RootCA certificate are locally stored in the eUICC 108, e.g., in the ECASD 370.

FIG. 4B illustrates a flowchart 420 of an exemplary procedure to create and deploy secured scripts to update (e.g., install new, modify existing, delete existing) certificate credentials for the eUICC 108 of the wireless device 102, where the update occurs after manufacturing of the eUICC 108, after installation of the eUICC 108 in the wireless device 102, and after manufacturing of the wireless device 102 completes. Updating of certificate credentials on the eUICC 108 of the wireless device 102 can occur in the field, e.g., at a retail sales location, during device activation, by a user of the wireless device 102, etc. The EUM generation module 402 of the EUM 322 generates one or more secured scripts that include certificate credentials for updating the eUICC 108 of the wireless device 102 using the EUM keyset previously generated by the EUM generation module 402 during eUICC 108 manufacture, where the EUM keyset is specific to the eUICC 108 of the wireless device 102, e.g., generated based on the unique EID value of the eUICC 108. The update certificate credentials have a certificate chain that stems from a different CI RootCA certificate 302 for a different CI than the original set of certificate credentials generated and installed during eUICC 108 manufacturing. For example, the original set of certificate credentials can stem from a GSMA CI, while the update set of certificate credentials can stem from a CTTL CI. The secured scripts are transferred to an OEM system 424, which stores the secured scripts in one or more OEM networked servers 426, where the secured scripts are associated with the unique EID value for the eUICC 108. As such, the secured scripts can only be used with the particular eUICC 108. Generation and storage of the secured scripts can occur after manufacture of the eUICC 108, after installation of the eUICC 108 in the wireless device 102, and after manufacture of the wireless device 102 is completed in an OEM factory. In some cases, one or more secured scripts are pre-generated by the EUM generation module 402 of the EUM 322 and stored at an OEM networked server 406 for later installation on the eUICC 108 of the wireless device 102, e.g., during an activation procedure of the wireless device 102 and/or during a personalization procedure for the eUICC 108 of the wireless device 102. In some cases, one or more secured scripts are generated by the EUM generation module 402 of the EUM 322 responsive to a request for a secured script from an OEM networked server 406, e.g., during an activation procedure of the wireless device 102 and/or during a personalization procedure for the eUICC 108 of the wireless device 102. To update the certificate credentials on the eUICC 108 in the field, the OEM system 424 can access a secured script associated with the eUICC 108 (based on the EID value) from the one or more OEM networked servers 426 and also access from a hardware security module (HSM) PKI credentials, e.g., the OEM Root CA certificate, public and private keys and associated certificates, to use to generate a signed payload message that includes the secured script. The signed payload message is transferred to the eUICC 108 via a device processor 362 of the wireless device 102 using multiple application protocol data units (APDUs). The eUICC 108 can verify a signature of the signed payload message using its own stored certificate credentials, e.g., the OEM Root CA certificate, and after successful verification, execute the secured script extracted from the signed payload message to install the new certificate credentials in the eUICC 108. In some embodiments, the new certificate credentials supplement the original certificate credentials. In some embodiments, the new certificate credentials update the original certificate credentials. In some embodiments, the new certificate credentials replace the original certificate credentials.

FIG. 5 illustrates a flowchart 500 of an exemplary process to install new or updated certificate credentials on an eUICC 108 of a wireless device 102 during a device activation procedure. A device processor 362 of the wireless device 102 initiates device activation with an OEM system 424. The OEM system 424 can check a configuration for the wireless device 102, e.g. based on a stock keeping unit (SKU) value associated with the wireless device 102 to determine certificate credentials that are applicable to the wireless device 102. The OEM system 424 can retrieve from an OEM networked server 426 a secured script associated with the unique EID value of the eUICC 108 of the wireless device 102. The OEM system 424 can also access from a hardware security module (HSM) PKI credentials, e.g., the OEM Root CA certificate, public and private keys and associated certificates, to use to generate a signed payload for an activation ticket that includes the secured script. The OEM system 424 transfers the activation ticket to the device processor 362, which transfers the signed payload included in the activation ticket to the eUICC 108 via multiple APDUs. The eUICC 108 can verify a signature of the signed payload message using its own stored certificate credentials, e.g., the OEM RootCA certificate 376, and after successful verification, execute the secured script extracted from the signed payload message to install the new certificate credentials in the eUICC 108. In some embodiments, the new certificate credentials supplement the original certificate credentials. In some embodiments, the new certificate credentials update the original certificate credentials. In some embodiments, the new certificate credentials replace the original certificate credentials.

FIGS. 6A, 6B, 6C, and 6D illustrate flowcharts 600, 630, 650, 660 of an exemplary procedure to install certificate credentials in an eUICC 108 of a wireless device 102 during a procedure to provision an eSIM 208 to the wireless device 102. Optional information that can be included in messages and/or optional actions are enclosed in square brackets in the flowcharts. At 602, a device-based (external to the eUICC 108) local profile assistant (LPAd) 364 initiates a procedure to download an eSIM 208 from an SM-DP+ 352. At 604, the LPAd 364 sends a message to the eUICC 108 to obtain a first set of eUICC information (eUICC1), which the eUICC 108 returns to the LPAd 364 at 606. At 608, the LPAd 364, in some cases, can restricts use of public keys indicated in eUICCInfo1 to an allowed CI PKId based on regulatory constraints. At 610, the LPAd 364 determines whether the wireless device 102 is located in a region for which additional certificate credentials are required in order to obtain the eSIM 208 from the SM-DP+ 352. At 612, when additional certificate credentials are required, the LPAd 364 edits eUICCInfo1 to add a regional CI to one or more CI PKId lists included in eUICCInfo1. At 614, the LPAd 364 requests an eUICC challenge value from the eUICC 108, which generates the eUICC challenge value, at 616, and returns the generated eUICC challenge value to the LPAd 364 at 618. At 620, the LPAd 364 establishes a secure HTTPS connection to the SM-DP+ 352 and sends an initiate authentication message to the SM-DP+ 352, at 622, the initiate authentication message including the generated eUICC challenge, the edited eUICCInfo1, and an address of the SM-DP+. At 632, the SM-DP+ 352 can verify the SM-DP+ address and verify information in the eUICCInfo1. When an error is detected by the SM-DP+ 352, an error message can be returned to the LPAd 364. For example, if the appropriate regional CI for the SM-DP+ 352 is not included in the eUICCInfo1, the SM-DP+ 352 can halt authentication with the LPAd 364 of the wireless device 102. By including the regional CI in the eUICCInfo1 (as edited at 608), the LPAd 364 allows the mutual authentication procedure to continue. At 636, the SM-DP+ 352 generates a transaction identifier (ID), generates a server challenge, assembles a signed server message that includes the transaction ID, the eUICC challenge, the server challenge, the SM-DP+ address, and optionally a session context indication. The SM-DP+ 352 computes a signature for the signed server message and replies to the LPAd 364, at 638, with the signed server message, the computed signature, the transaction ID, an indication of the eUICC PKId to be used for authentication, an SM-DP+ authentication certificate, and optionally i) an indication of intermediate certificates in a chain for the SM-DP+ authentication certificate and ii) a certificate revocation list (CRL). At 640, the LPAd 364 determines whether an eUICC PKId identified by the SM-DP+ 352 to be used is the regional CI added to the CI PKId list included in the eUICCInfo1 sent to the SM-DP+ 352. When additional certificate credentials are required (e.g., the certificate credentials corresponding to the identified regional CI are not unavailable in the eUICC 108), the LPAd 364 and the eUICC 108 initiate a management session with one or more networked servers 406 to obtain and install the additional certificate credentials in the eUICC 108 of the wireless device 102. The procedure for obtaining and installing the additional certificate credentials is further detailed in FIGS. 7A, 7B, 7C, 7D, and 7E.

After successful installation of the certificate credentials required for the identified regional CI, the LPAd 364, at 652, verifies the SM-DP+ address received from the SM-DP+ 352, verifies a session context, optionally verifies an OID value and an indicated CI restriction, and generates the ctxParams1 data structure. At 654, the LPAd 364 sends to the eUICC 108 an authenticate server message that includes the signed server message and its accompanying signature, the indication of the eUICC PKId to be used for authentication, the SM-DP+ authentication certificate or a server certificate chain for the SM-DP+ 352, the ctxParams1 data structure, and optionally i) the indication of intermediate certificates in a chain for the SM-DP+ authentication certificate and ii) the certificate revocation list (CRL) if provided previously by the SM-DP+ 352. At 656, the eUICC 108 verifies the SM-DP+ server certificate chain, the signed server message, and the signature accompanying the signed server message. Verification of the SM-DP+ 352 can be based on the updated certificate credentials, at least in part, previously installed on the eUICC 108 for the CI PKId to be used and applicable for the regional CI. When the SM-DP+ 352 is successfully authenticated by the eUICC 108, the eUICC 108 returns to the LPAd 364 an eUICC signed message, an eUICC signature accompanying the eUICC signed message, an eUICC certificate, an indication of a next certificate in a chain for the eUICC certificate, and optionally an indication of other intermediate certificates in a certificate chain for the eUICC certificate. The eUICC certificate returned at 658 can be one of the certificate credentials updated by the wireless device 102 and applicable for the regional CI. At 660, the LPAd 364 sends to the SM-DP+ 352 an authenticate client message that includes the eUICC signed message, the eUICC generated signature, the eUICC certificate, the indication of the next certificate in the certificate chain for the eUICC certificate, and optionally an indication of the intermediate certificates in the certificate chain for the eUICC certificate. At 662, the SM-DP+ verifies the eUICC certificate chain, the eUICC signed message, and the eUICC signature accompanying the eUICC signed message. When the eUICC 108 is successfully verified, the mutual authentication procedure completes, and the process of downloading an eSIM 208 to the eUICC 108 from the SM-DP+ 352 continues. When verification of the eUICC 108 is not successful, the SM-DP+ 352, at 664, sends an error indication to the LPAd 364, which can send a cancel session message at 666 to the eUICC 108 to halt the mutual authentication procedure.

Figure 7A:
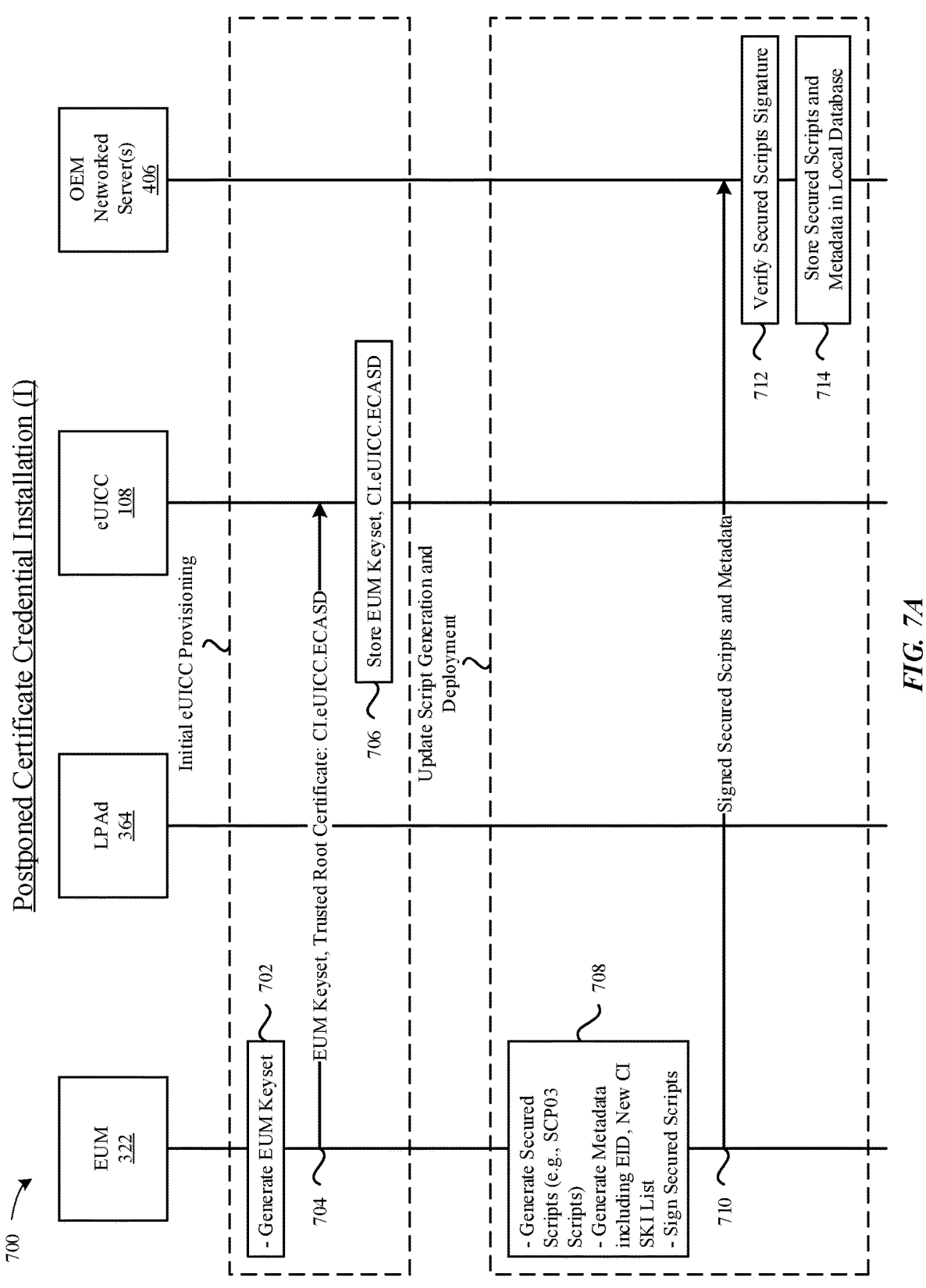
FIGS. 7A, 7B, 7C, 7D, and 7E illustrate flowcharts of an exemplary procedure to generate, deploy, download, and execute secured scripts to install certificate credentials on an eUICC of a wireless device post-manufacturing, according to some embodiments.
Figure 7B:
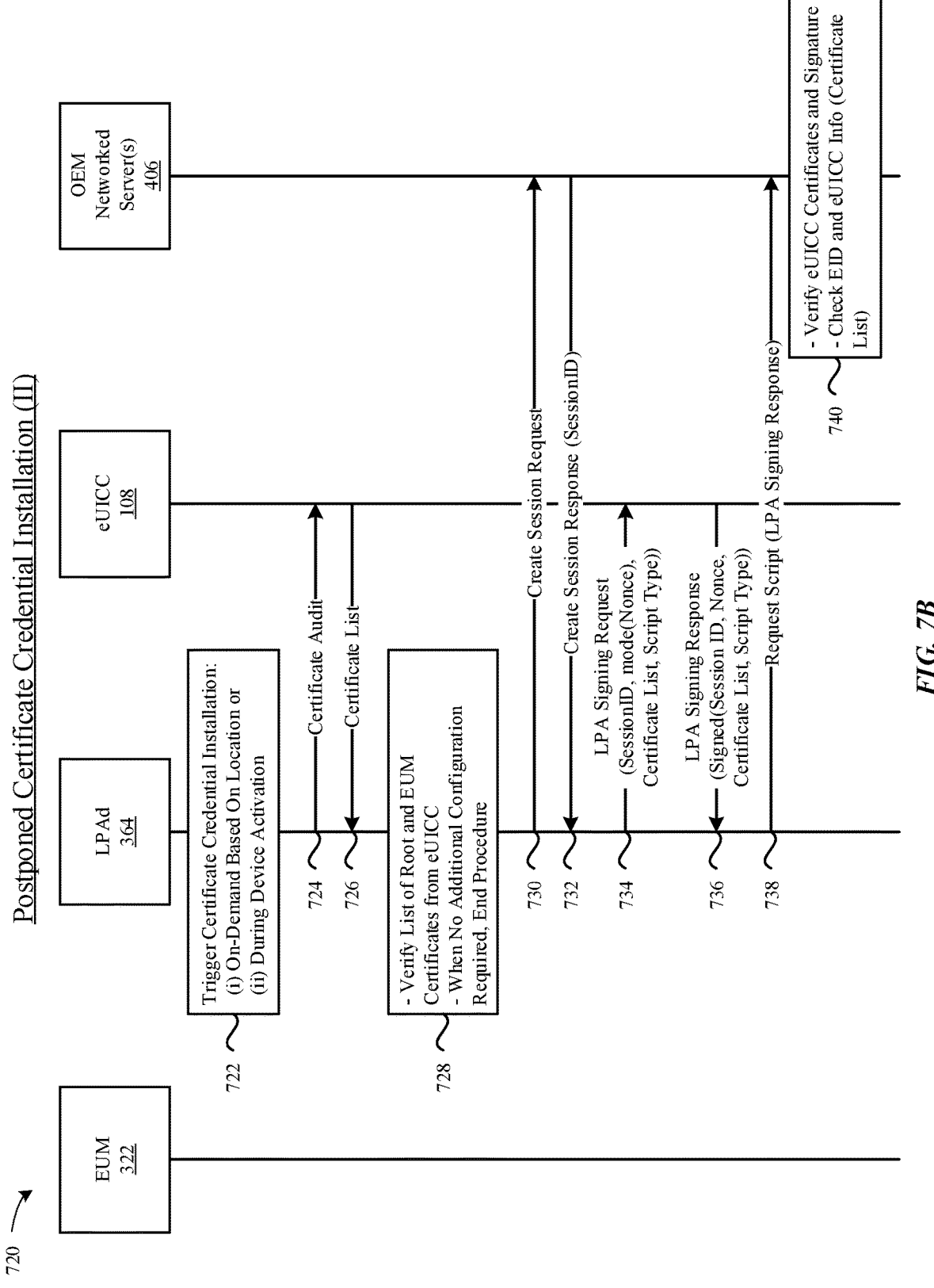
Figure 7C:
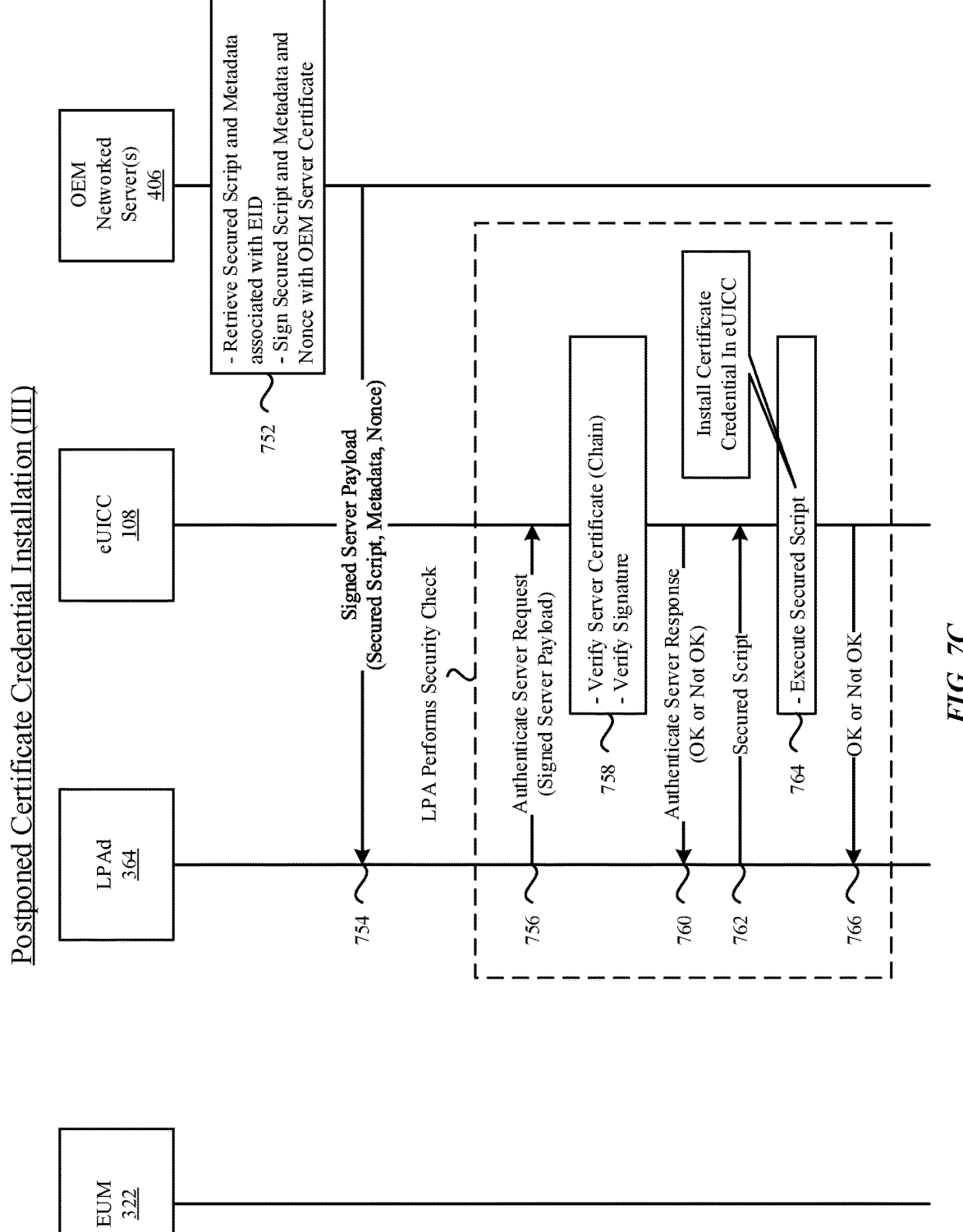
Figure 7D:
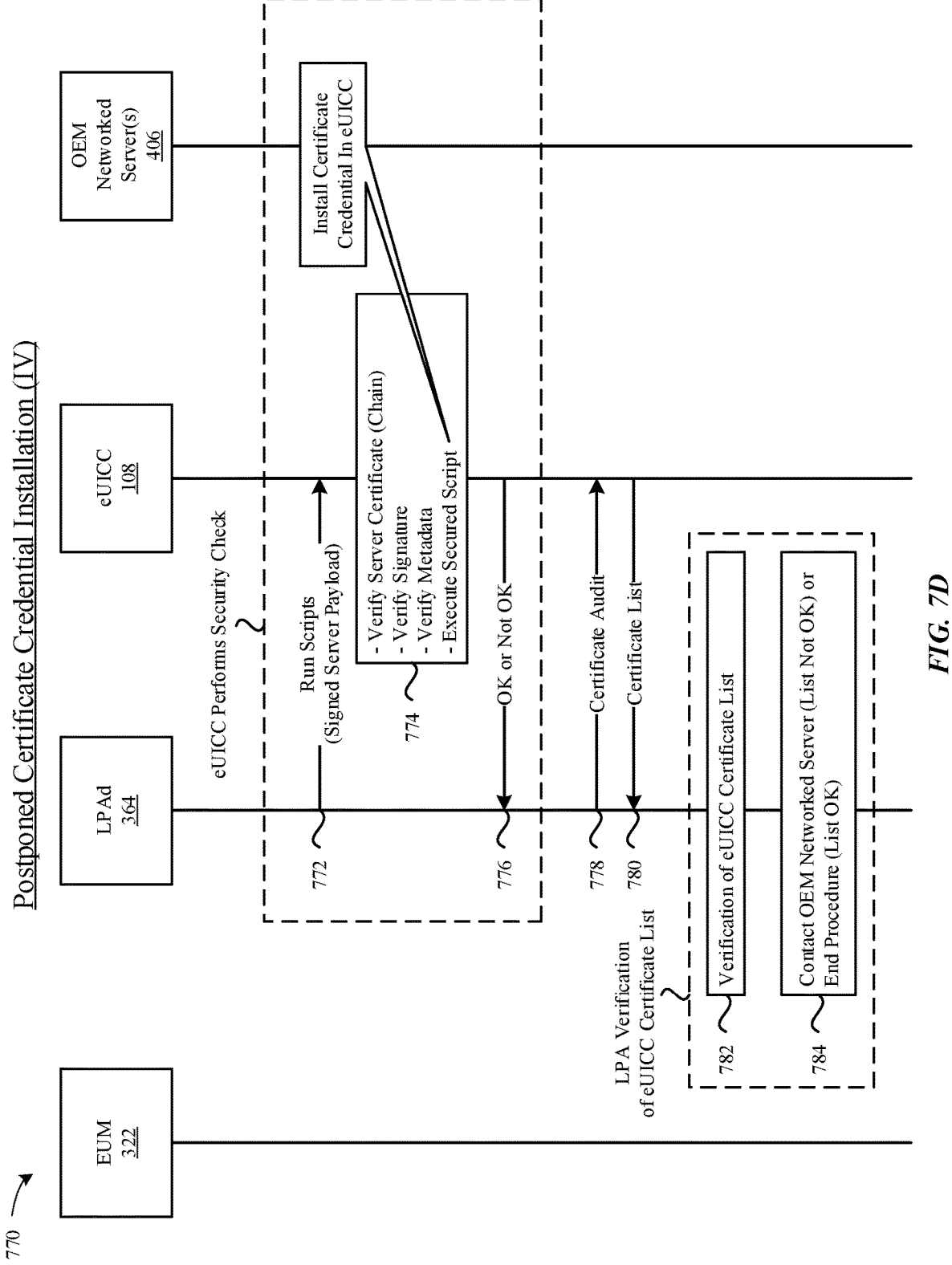
Figure 7E:
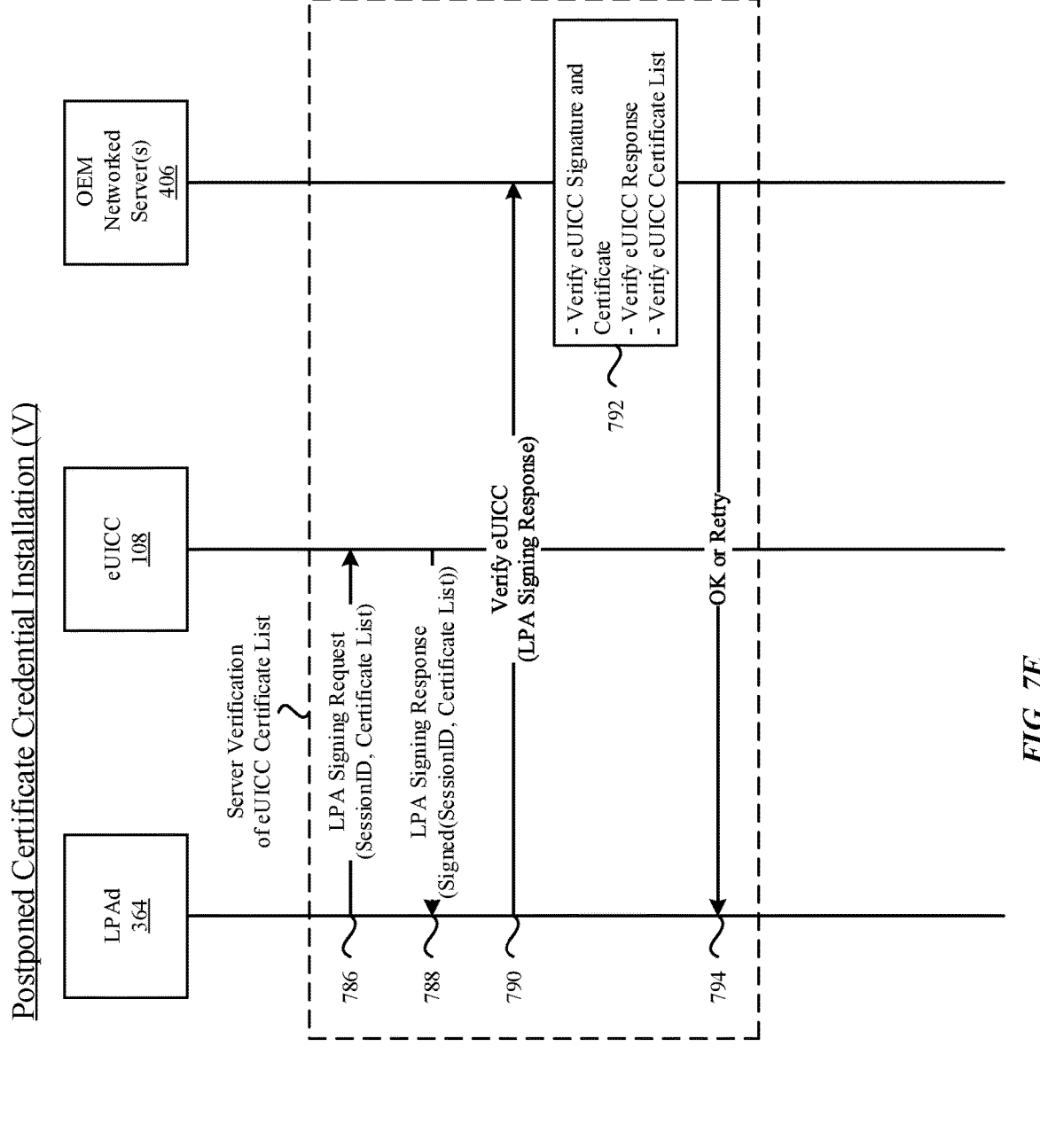

FIGS. 7A, 7B, 7C, 7D, and 7E illustrates flowcharts 700, 720, 750, 770, 785 of an exemplary procedure to generate, deploy, download, and execute secured scripts to install certificate credentials on an eUICC 108 of a wireless device 102 post-manufacturing of the eUICC 108 and of the wireless device 102, e.g., while the wireless device 102 is operable in the field. FIG. 7A illustrates a flowchart 700 of an initial provisioning of certificate credentials to an eUICC 108 of a wireless device 102, e.g., as previously discussed regarding FIG. 4A, and generation and deployment of secured scripts to update (e.g., add, modify, remove) certificate credentials for the eUICC 108 of the wireless device 102, e.g., as previously discussed regarding FIG. 4B. At 702, the EUM 322 generates an EUM keyset (e.g., a set of symmetric AES keys or a set of asymmetric ECC keys for the eUICC 108). In some embodiments, the EUM keyset is specific to the eUICC 108 of the wireless device 102. In some embodiments, the EUM keyset can be generated using a unique value associated with the eUICC 108, e.g., a unique eUICC ID (EID) value for the eUICC 108. At 704, the EUM 322 installs the EUM keyset with a trusted root CI certificate, which is the OEM RootCA certificate 376 discussed hereinabove, in the eUICC 108. At 706, the eUICC 108 stores the EUM keyset and the trusted root CI certificate securely in an ECASD 370 of the eUICC 108. Initial eUICC provisioning of certificate credentials can occur at the EUM 322 as part of an eUICC 108 manufacturing and customization process.

After installation of the eUICC 108 in a wireless device 102 and subsequent delivery of the wireless device 102 via a sales channel or directly to a user, the certificate credentials of the eUICC 108 can be updated based on secured scripts, which can be pre-generated offline and stored for future use by the wireless device 102. At 708, the EUM 322 generates one or more secured scripts, which can be scripts in accordance with SCP03 and are specific to the particular eUICC 108 of the wireless device 102. The EUM 322, at 708, also generates metadata, which in some embodiments can include a unique EID value of the eUICC 108 and a new Subject Key Identifier (SKI) list of CI Public Key Identifiers (PKIs). The secured scripts include new certificate credentials, which can correspond to a different CI 320 than the CI 320 associated with the certificate credentials initially installed in the eUICC 108 during initial eUICC provisioning. For example the trusted root certificate and the EUM keyset installed at 704 can be for a first CI 320 applicable for a first geographic region, while the certificate credentials in the secured scripts can be for a second CI 320 applicable for a second geographic region. In some cases, the new certificate credentials supplement the existing certificate credentials in the eUICC 108 of the wireless device 102. In some cases, the new certificate credentials replace the existing certificate credentials in the eUICC 108 of the wireless device 102. In some cases, the new certificate credentials correspond to the same CI 320 associated with the initial eUICC provisioning, such as when the new certificate credentials provide a modification to or replacement of the existing certificate credentials in the eUICC 108 for the same CI 320. At 710, the EUM 322 provides the signed secured scripts and metadata to one or more OEM networked servers 406 for secure storage and later retrieval. At 712, the OEM networked server(s) 406 verify a signature accompanying the secured scripts, and at 714, after successful verification, the OEM networked server(s) 406 store the secured scripts and metadata in a local database.

At 722, the LPAd 364 triggers a procedure to install updated certificate credentials to the eUICC 108 of the wireless device 102. The procedure can be triggered on-demand, e.g., based on a location at which the wireless device 102 is operating and requires updated credentials to perform a mutual authentication operation, such as during an eSIM 208 provisioning, or can be triggered during a device activation procedure, e.g., when configuring the wireless device 102 for cellular wireless service access. At 724, the LPAd 364 sends a certificate audit command to the eUICC 108 and receives in return from the eUICC 108 a certificate list indicating the certificate credentials currently installed in the eUICC 108 of the wireless device 102. At 728, the LPAd verifies the eUICC-provided certificate list, which can indicate one or more CI rootCA certificates 302 and one or more EUM CA certificates 306. When no additional configuration of the eUICC 108 is required, e.g., the necessary certificate credentials are already installed in the eUICC 108, the postponed certificate credential installation procedure can end. When at least one certificate credential required for operation of the wireless device 102 is not included in the eUICC 108 (based on the eUICC certificate list), the LPAd 364 can establish a session with an OEM networked server 406 by sending a create session request, at 730, to the OEM networked server 406, which replies at 732, with a create session response that includes a session identifier (ID) value. The LPAd 364 sends to the eUICC 108, at 734, an LPA signing request message, which includes the session ID value, a mode (nonce) value, the certificate list from the eUICC 108, and a script type that indicates a particular secured script required by the eUICC 108, e.g., a secured script for installation of new certificate credentials for a particular CI 320. The LPAd 364 receives from the eUICC 108, at 736, an LPA signing response message that includes the previous payload with an accompanying eUICC generated signature to be used for verification with the OEM networked server 406. The LPAd 364, at 738, sends to the OEM networked server a request script message that includes the signed payload and an eUICC certificate chain used by the eUICC 108 to sign the LPA signing response. The OEM networked server 406, at 740, verifies the eUICC certificates of the eUICC certificate chain and the signature of the LPA signing response, and upon successful verification, the OEM networked server 406 checks the EID value for the eUICC 108 and the certificate list (or eUICC info) included in the signed payload. The OEM networked server 406, at 752, retrieves a particular secured script and metadata associated with the EID value of the eUICC 108 and identified by the script type and signs the secured script, metadata, and a nonce using an OEM server certificate. At 754, the OEM networked server 406 returns to the LPAd 364 a signed server payload message that includes the secured script, metadata and nonce.

Either the LPAd 364 or the eUICC 108 can perform a security check on the signed server payload received from the OEM networked server 406 before execution of the secured script. For the variant in which the LPAd 364 performs the security check, at 756, the LPAd 364 sends to the eUICC 108 an authenticate server request message that includes the signed server payload in order to authenticate the OEM networked server 406. At 758, the eUICC 108 verifies the signature of the signed server payload and an applicable server certificate (or certificate chain). The eUICC 108, at 760, returns to the LPAd 364 an authenticate server response message that indicates whether authentication of the OEM networked server 406 is successful (OK) or not successful (Not OK). When the OEM networked server 406 is successfully authenticated, the LPAd 364 provides the secured script to the eUICC 108, which executes the secured script, at 764, to install one or more certificate credentials on the eUICC 108 of the wireless device 102. The eUICC 108, at 766, provides to the LPAd 364 an indication of whether the certificate credentials were successfully installed on the eUICC 108. For the variant in which the eUICC 108 performs the security check, at 772, the LPAd 364 sends to the eUICC 108 a run scripts message that includes the signed server payload. At 774, the eUICC 108 verifies the signed server payload, e.g., by verifying the OEM networked server certificate (or certificate chain), the signature of the signed server payload, and the metadata included in the signed server payload. When the OEM networked server 406 is successfully verified, the eUICC 108 executes the secured script to install one or more certificate credentials on the eUICC 108 of the wireless device 102. The eUICC 108, at 776, provides to the LPAd 364 an indication of whether the certificate credentials were successfully installed on the eUICC 108.

The LPAd 364 can confirm successful installation of the new certificate credentials in the eUICC 108 by sending, to the eUICC 108 at 778, a certificate audit message to obtain from the eUICC 108 at 780 a current (updated) certificate list from the eUICC 108. In some embodiments the LPAd 364 verifies changes to the certificate list at 782. In some embodiments, the LPAd 364 contacts the OEM networked server 406 when the updated certificate list does not indicate the expected changes, e.g., to retry installation of the certificate credentials with another secured script. In some embodiments, the secured scripts include an anti-replay mechanism to disallow executing the secured script more than once. After unsuccessful installation of certificate credentials on the eUICC 108, which can occur as a result of extraneous error conditions, e.g., a device reset or processor reset that interrupts the certificate credential installation process, the LPAd 364 can establish a new session with the OEM networked server 406 to obtain another secured script to install the certificate credentials. Multiple secured scripts for installation of a particular set of certificate credentials for an eUICC 108 can be pre-generated by the EUM 322 (e.g., with sequence numbering) to allow the wireless device 102 to obtain from the OEM networked server a next (or subsequent) secured script when a previous secured script fails.

In some embodiments, the wireless device 102 has the OEM networked server 406 verify the updated eUICC certificate list. At 786, the LPAd 364 sends to the eUICC 108 an LPA signing request message that includes the session ID and the certificate list received from the eUICC 108. The eUICC 108 replies to the LPAd 364, at 788, with an LPA signing response that includes a signature generated by the eUICC 108 along with the session ID and certificate list. At 790, the LPAd 364 sends the LPA signing response message to the OEM networked server 406 for verification of the updated certificate list for the eUICC 108. At 792, the OEM networked server verifies the eUICC signature and certificate, the eUICC response, and the eUICC certificate list. At 794, the OEM networked server 406 provides a response indicating the certificate list of the eUICC 108 has been updated as expected (OK) or has not been updated as expected (Retry).

FIG. 8A illustrates a flowchart 800 of an exemplary method to install one or more certificate credentials on an eUICC 108 of a wireless device 102. At 802, an LPA of the wireless device 102, e.g., LPAd 364 or LPAe 368, determines a requirement to install one or more certificate credentials on the eUICC 108 of the wireless device 102. At 804, the LPA 364, 368 establishes a secure communication session with an OEM networked server 406. At 806, the LPA 364, 368 sends, to the OEM networked server 406, a request script message to obtain the one or more certificate credentials. At 808, the LPA 364, 368 receives, from the OEM networked server 406, a signed server payload message that includes a secured script for installing the one or more certificate credentials. At 810, the LPA 364, 368 provides, to the eUICC 108, either the signed server payload message (to be verified by the eUICC 108 before execution of the secured script) or the secured script (after verification of the signed server payload message by the LPA 364, 368). At 812, the LPA 364, 368 verifies installation of the one or more certificate credentials on the eUICC 108 after execution of the secured script by the eUICC 108.

In some embodiments, the LPA 364, 368 determines the requirement to install the one or more certificate credentials by at least: i) obtaining from the eUICC 108 a certificate list, and ii) determining based on the certificate list that the one or more certificate credentials are not included in the eUICC 108. In some embodiments, the LPA 364, 368 determines the requirement to install the one or more certificate credentials during a device activation procedure for the wireless device 102. In some embodiments, the LPA 364, 368 determines the requirement to install the one or more certificate credentials based on a geographic location at which the wireless device 102 is operating. In some embodiments, the LPA 364, 368 determines the requirement to install the one or more certificate credentials based on a geographic region for an eSIM 208 to be installed on the eUICC 108 of the wireless device 102. In some embodiments, the OEM networked server 406 retrieves the secured script based on an eUICC identifier (EID) value of the eUICC 108 of the wireless device 102. In some embodiments, the signed server payload message includes a signature generated by the OEM networked server 406 and an OEM server certificate, and the method further includes: i) the LPA 364, 368 providing to the eUICC 108 the signed server payload message, and ii) the eUICC 108 verifying the signature and the OEM server certificate prior to execution of the secured script included in the signed server payload message. In some embodiments, the one or more certificate credentials include: i) a certificate issuer (CI) root certificate authority (CA) certificate 302 generated by a CI 320, and ii) an eUICC manufacturer (EUM) CA certificate 306 generated by the CI 320 for an EUM 322. In some embodiments, the one or more certificate credentials further include eUICC credentials specific to the eUICC 108 of the wireless device 102 including: iii) an eUICC certificate 310 generated by the EUM 322 for the eUICC 108 based on a unique EID value of the eUICC 108, and iv) an eUICC private and public key pair generated by the EUM 322. In some embodiments, the EUM 322 pre-generates the secured script that includes the one or more certificate credentials and provides the secured script to the OEM networked server 406 prior to the LPA 364, 368 of the wireless device 102 determining the requirement to install the one or more certificate credentials on the eUICC 108 of the wireless device 102. In some embodiments, the LPA 364, 368 operates on a processor 104 of the wireless device 102 external to the eUICC 108, e.g., on a device processor 362 or a baseband component 110 of baseband wireless circuitry of the wireless device 102. In some embodiments, installation of the certificate credentials on the eUICC 108 occurs after manufacture of the eUICC 108 and after manufacture of the wireless device 102.

FIG. 8B illustrates a flowchart 850 of an exemplary method to provide to a wireless device 102 a secured script for installing one or more certificate credentials on an eUICC 108 of the wireless device 102. At 852, an OEM networked server 406 establishes a secure communication session with an LPA, e.g., LPAd 364 or LPAe 368, of the wireless device 102. At 854, the OEM networked server 406 receives, from the LPA 364, 368 of the wireless device 102, a request script message to obtain one or more certificate credentials. At 856, the OEM networked server 406, obtains, based on an eUICC identifier (EID) value for the eUICC 108 of the wireless device 102, a secured script and metadata for installing the one or more certificate credentials. At 858, the OEM networked server 406 sends, to the LPA 364, 368 of the wireless device 102, a signed server payload message that includes the secured script for installing the one or more certificate credentials.

In some embodiments, the OEM networked server 406 receives, from an eUICC manufacturer (EUM) 322, the secured script for installing the one or more certificate credentials prior to receiving the request script message from the LPA 364, 368 of the wireless device 102. In some embodiments, the OEM networked server 406: i) sends, to the EUM 322, a request for the secured script for installing the one or more certificate credentials after receiving the request script message from the LPA of the wireless device, and ii) receives, from the EUM 322, the secured script for installing the one or more certificate credentials responsive the request for the secured script. In some embodiments, the EUM 322 generates on demand during an activation procedure for the wireless device 102 and/or as part of a personalization procedure for the eUICC 108 of the wireless device 102. In some embodiments, the OEM networked server 406: i) receives, from the LPA 364, 368 of the wireless device 102 after sending the secured script for installing the one or more certificate credentials, a message that indicates a list of certificates installed on the eUICC 108 of the wireless device 102; and ii) verifies, based on the list of certificates, whether the one or more certificate credentials are installed on the eUICC 108 of the wireless device 102. In some embodiments, the OEM networked server 406 provides, to the LPA 364, 368 of the wireless device 102 after verification, a message indicating successful or unsuccessful installation of the one or more certificate credentials on the eUICC 108 of the wireless device 102.

Representative Computing Device

FIG. 9 illustrates a detailed view of a representative computing device 900 that can be used to implement various methods described herein, according to some embodiments. In particular, the detailed view illustrates various components that can be included in the wireless device 102. As shown in FIG. 9, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Still further, the computing device 900 can include a display 910 that can be controlled by the processor 902 to display information to the user. A data bus 916 can facilitate data transfer between at least a storage device 940, the processor 902, and a controller 913. The controller 913 can be used to interface with and control different equipment through an equipment control bus 914. The computing device 900 can also include a network/bus interface 911 that communicatively couples to a data link 912. In the case of a wireless connection, the network/bus interface 911 can include a wireless transceiver.

The computing device 900 also includes a storage device 940, which can comprise a single disk or a plurality of disks (e.g., hard drives), and includes a storage management module that manages one or more partitions within the storage device 940. In some embodiments, storage device 940 can include flash memory, semiconductor (solid state) memory or the like. The computing device 900 can also include a Random Access Memory (RAM) 920 and a Read-Only Memory (ROM) 922. The ROM 922 can store programs, utilities or processes to be executed in a non-volatile manner. The RAM 920 can provide volatile data storage, and stores instructions related to the operation of computing device 900. The computing device 900 further includes a secure element 924, which can include an eUICC 108 on which to store one or more eSIMs 208. In some embodiments, the wireless device 102 also includes a UICC 118 (physical SIM card).

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for postponed certificate credential installation to a wireless device, the method comprising:
by a local profile assistant (LPA) of the wireless device:
determining a requirement to install one or more certificate credentials on in an embedded universal integrated circuit card (eUICC) Controlling Authority Security Domain (ECASD) of an eUICC of the wireless device;

establishing a secure communication session with an original equipment manufacturer (OEM) networked server;
sending, to the OEM networked server, a request script message to obtain the one or more certificate credentials;
receiving, from the OEM networked server, a signed server payload message that includes a secured script for installing the one or more certificate credentials;
providing, to the eUICC, the signed server payload message or the secured script; and
verifying installation of the one or more certificate credentials on the eUICC after execution of the secured script by the eUICC,
wherein:
the one or more certificate credentials comprise a certificate issuer (CI) root certificate authority (CA) certificate generated by a CI to supplement an OEM root CA certificate preinstalled in the ECASD of the eUICC in association with manufacture of the wireless device; and
the one or more certificate credentials are separate from electronic subscriber identity module (eSIM) profiles stored in the eUICC.

2. The method of claim 1, wherein:
determining the requirement to install the one or more certificate credentials comprises:
obtaining from the eUICC a certificate list; and
determining based on the certificate list that the one or more certificate credentials are not included in the eUICC.

3. The method of claim 2, wherein the LPA determines the requirement to install the one or more certificate credentials during a device activation procedure for the wireless device.

4. The method of claim 2, wherein the LPA determines the requirement to install the one or more certificate credentials based on a geographic location at which the wireless device is operating.

5. The method of claim 2, wherein the LPA determines the requirement to install the one or more certificate credentials based on a geographic region for an electronic subscriber identity module (eSIM) to be installed on the eUICC of the wireless device.

6. The method of claim 1, wherein:
the OEM networked server retrieves the secured script based on an eUICC identifier (EID) value of the eUICC of the wireless device.

7. The method of claim 1, wherein:
the signed server payload message comprises a signature generated by the OEM networked server and an OEM server certificate; and
the method further comprises:
providing, by the LPA to the eUICC, the signed server payload message; and
verifying, by the eUICC, the signature and the OEM server certificate prior to execution of the secured script included in the signed server payload message.

8. The method of claim 1, wherein one or more certificate credentials further comprise:
an eUICC manufacturer (EUM) CA certificate generated by the CI for an EUM.

9. The method of claim 8, wherein the one or more certificate credentials further include eUICC credentials specific to the eUICC of the wireless device comprising:
an eUICC certificate generated by the EUM for the eUICC based on a unique EID value of the eUICC; and an eUICC private and public key pair generated by the EUM.

10. The method of claim 8, wherein the EUM pre-generates the secured script that includes the one or more certificate credentials and provides the secured script to the OEM networked server prior to the LPA of the wireless device determining the requirement to install the one or more certificate credentials on the eUICC of the wireless device.

11. The method of claim 1, wherein:

the LPA operates on a processor of the wireless device external to the eUICC; and installation of the certificate credentials on the eUICC occurs after manufacture of the eUICC and after manufacture of the wireless device.

12. A method for postponed certificate credential installation to a wireless device, the method comprising:

by an original equipment manufacturer (OEM) networked server:

establishing a secure communication session with a local profile assistant (LPA) of the wireless device;

receiving, from the LPA of the wireless device, a request script message to obtain one or more certificate credentials;

obtaining, based on an embedded universal integrated circuit card (eUICC) identifier (EID) value for the eUICC of the wireless device, a secured script and metadata for installing the one or more certificate credentials; and sending, to the LPA of the wireless device, a signed server payload message that includes the secured script for installing the one or more certificate credentials in an eUICC Controlling Authority Security Domain (ECASD) of the eUICC, wherein:

the one or more certificate credentials comprise a certificate issuer (CI) root certificate authority (CA) certificate generated by a CI to supplement an OEM root CA certificate preinstalled in the ECASD of the eUICC in association with manufacture of the wireless device; and the one or more certificate credentials are separate from electronic subscriber identity module (eSIM) profiles stored in the eUICC.

13. The method of claim 12, further comprising:

by the OEM networked server:

receiving, from an eUICC manufacturer (EUM), the secured script for installing the one or more certificate credentials prior to receiving the request script message from the LPA of the wireless device.

14. The method of claim 12 further comprising:

by the OEM networked server:

sending, to an eUICC manufacturer (EUM), a request for the secured script for installing the one or more certificate credentials after receiving the request script message from the LPA of the wireless device; and receiving, from the EUM, the secured script for installing the one or more certificate credentials responsive to the request for the secured script.

15. The method of claim 12, further comprising:

by the OEM networked server:

receiving, from the LPA of the wireless device after sending the secured script for installing the one or more certificate credentials, a message that indicates a list of certificates installed on the eUICC of the wireless device; and verifying, based on the list of certificates, whether the one or more certificate credentials are installed on the eUICC of the wireless device.

16. The method of claim 15, further comprising:

by the OEM networked server:

providing, to the LPA of the wireless device after verification, a message indicating successful or unsuccessful installation of the one or more certificate credentials on the eUICC of the wireless device.

17. A wireless device comprising:

wireless circuitry comprising one or more antennas;

an embedded universal integrated circuit card (eUICC); and a processor communicatively coupled to the wireless circuitry, the eUICC, and a memory storing instructions that configure the wireless device to perform a postponed certificate credential installation including:

determining a requirement to install one or more certificate credentials in an eUICC Controlling Authority Security Domain (ECASD) of on the eUICC of the wireless device;

establishing a secure communication session with an original equipment manufacturer (OEM) networked server;

sending, to the OEM networked server, a request script message to obtain the one or more certificate credentials;

receiving, from the OEM networked server, a signed server payload message that includes a secured script for installing the one or more certificate credentials;

providing, to the eUICC, the signed server payload message or the secured script; and verifying installation of the one or more certificate credentials on the eUICC after execution of the secured script by the eUICC, wherein:

the one or more certificate credentials comprise a certificate issuer (CI) root certificate authority (CA) certificate generated by a CI to supplement an OEM root CA certificate preinstalled in the ECASD of the eUICC in association with manufacture of the wireless device; and the one or more certificate credentials are separate from electronic subscriber identity module (eSIM) profiles stored in the eUICC.

18. The wireless device of claim 17, wherein the processor determines the requirement to install the one or more certificate credentials by at least:

obtaining from the eUICC a certificate list; and determining based on the certificate list that the one or more certificate credentials are not included in the eUICC.

19. The wireless device of claim 18, wherein the processor determines the requirement to install the one or more certificate credentials based on a geographic location at which the wireless device is operating.

20. The wireless device of claim 18, wherein the processor determines the requirement to install the one or more certificate credentials based on a geographic region for an electronic subscriber identity module (eSIM) to be installed on the eUICC of the wireless device.

\* \* \* \* \*